(12) United States Patent
Kelsall et al.

(10) Patent No.: US 10,978,717 B2
(45) Date of Patent: Apr. 13, 2021

(54) AQUEOUS INK COMPOSITIONS

(71) Applicant: Nicholas Farandos, Greystones (IE)

(72) Inventors: Geoffrey Kelsall, London (GB); Lisa Kleiminger, London (GB); Nicholas Farandos, London (GB)

(73) Assignee: Nicholas Farandos, Greystones (IE)

( * ) Notice: Subject to any disclaimer, the term of this patent is extended or adjusted under 35 U.S.C. 154(b) by 56 days.

(21) Appl. No.: 16/312,240

(22) PCT Filed: Jun. 21, 2017

(86) PCT No.: PCT/GB2017/051819
§ 371 (c)(1),
(2) Date: Dec. 20, 2018

(87) PCT Pub. No.: WO2017/221010
PCT Pub. Date: Dec. 28, 2017

(65) Prior Publication Data
US 2019/0207227 A1 Jul. 4, 2019

(30) Foreign Application Priority Data
Jun. 22, 2016 (GB) .................................... 1610925

(51) Int. Cl.
C09D 11/32 (2014.01)
H01M 4/88 (2006.01)
(Continued)

(52) U.S. Cl.
CPC ......... H01M 4/8832 (2013.01); C09D 11/322 (2013.01); H01M 4/8882 (2013.01); H01M 4/9025 (2013.01); H01M 4/9033 (2013.01); H01M 8/126 (2013.01); H01M 8/1253 (2013.01); H01M 2008/1293 (2013.01); Y02E 60/50 (2013.01); Y02P 70/50 (2015.11)

(58) Field of Classification Search
None
See application file for complete search history.

(56) References Cited

U.S. PATENT DOCUMENTS 7,592,378 B2 * 9/2009 Lin ...................... B41M 5/0023
106/31.6
2002/0147250 A1 10/2002 Beach et al.
(Continued)

FOREIGN PATENT DOCUMENTS

GB 2490869 A * 11/2012 .......... H01M 4/8828
KR 2013 0047175 A 5/2013
KR 20130047175 A * 5/2013

OTHER PUBLICATIONS

Lee et al. K20130047175A translation. (Year: 2013).*

Primary Examiner — Cachet I Proctor
(74) Attorney, Agent, or Firm — Knobbe, Martens, Olson & Bear LLP

(57) ABSTRACT

This invention relates to aqueous ink compositions comprising an aqueous solvent, particles comprising a metal or a metal compound or a mixture thereof, a dispersant, preferably selected from an electrostatic dispersant, a steric dispersant, an ionic dispersant, a non-ionic dispersant or a combination thereof, a polymeric binder and a non-ionic surfactant which may be used for 3D inkjet printing components, primarily for high-temperature electrochemical devices.

23 Claims, 7 Drawing Sheets

(51) Int. Cl.
*H01M 4/90* (2006.01)
*H01M 8/126* (2016.01)
*H01M 8/1253* (2016.01)
*C09D 11/322* (2014.01)
*H01M 8/124* (2016.01)

(56) References Cited

U.S. PATENT DOCUMENTS

| | | |
|---|---|---|
| 2005/0026017 A1 | 2/2005 | Seabaugh et al. |
| 2007/0191508 A1* | 8/2007 | Nakagawa ............ C09D 11/322 523/160 |
| 2008/0085369 A1* | 4/2008 | Cai ..................... H05K 1/0373 427/379 |
| 2009/0169749 A1* | 7/2009 | Brust ................. C08G 18/5024 427/256 |
| 2009/0181309 A1 | 7/2009 | Kwon et al. |
| 2009/0274833 A1* | 11/2009 | Li ....................... C09D 11/037 427/123 |
| 2009/0314991 A1 | 12/2009 | Cho et al. |
| 2010/0242789 A1 | 9/2010 | Sano et al. |
| 2011/0076404 A1* | 3/2011 | Brust ................... C09D 11/322 427/256 |
| 2012/0105554 A1* | 5/2012 | Chun .................... B41J 2/1714 347/85 |
| 2013/0059223 A1 | 3/2013 | Finnerty et al. |
| 2014/0352573 A1* | 12/2014 | Kasperchik .......... C09D 11/326 106/15.05 |

* cited by examiner

AQUEOUS INK COMPOSITIONS

FIELD OF INVENTION

This invention relates to metal-oxide based aqueous ink compositions for 3D inkjet printing components, primarily for high-temperature electrochemical devices.

BACKGROUND

High oxide ion conductivity, temperature stability, and hardness lends metal oxide materials such as yttria-stabilized zirconia (YSZ) to many applications, including as the electrolyte phase in solid oxide fuel cells (SOFCs) and electrolysers (SOEs).

Conventional fabrication methods for SOFCs and SOEs involve mixing the constituent phases in powder form with a sacrificial pore forming phase to form pastes that are tape cast or screen printed into films, then subsequently dried and sintered. The gas-tight electrolyte is an oxide ion conductor, e.g. YSZ, that is mixed with an electronic conducting phase in both the positive and negative electrodes, e.g. respectively, nickel and lanthanum strontium manganite (LSM) for an SOFC. The electronic connections are usually made with silver or platinum wires, fixed to the electrodes by a conductive paste.

Such techniques result in poorly reproducible structures, porosities, and densities of so-called triple phase boundaries (TPBs) that are the intersection of individually percolated pores, electronically-conducting and ionically-conducting phases, at which reactions occur. Hence, microstructural engineering is critically important to improving electrochemical performance. Infiltrated-scaffold techniques with higher TPB densities and control over porosity are being developed (J. M. Vohs et al., Adv. Mater. 2009, 21, 943 and E. D. Wachsman et al., Science 2011, 334, 935, the contents of which is herein incorporated by reference in its entirety), the scaffolds being fabricated by tailored sintering of a ceramic film mixed with a pore-forming phase (M. Kishimoto et al., J. Power Sources 2014, 266, 291, the contents of which is herein incorporated by reference in its entirety), or by mining 'trenches' in pre-densified ceramic films with an excimer laser (K. Nagato et al., ECS Transactions 2015, 68, 1309, the contents of which is herein incorporated by reference in its entirety). However, the former technique has limited reproducibility and the latter's additional processing stages increase production cost significantly.

Therefore, identifying a technique that can fabricate pre-defined scaffold architectures reproducibly, with minimal processing stages, is challenging.

Additive manufacturing techniques offer the potential to fabricate the functional layers of SOFCs with high reproducibility and level of customization. Inkjet printing is particularly suited to fabrication of thin films from precursor colloidal particle dispersions ('inks') (C. Li et al., J. Power Sources 2015, 273, 465, the contents of which is herein incorporated by reference in its entirety), and has been deployed to produce layers of YSZ (V. Esposito et al., J. Power Sources 2015, 273, 89, the contents of which is herein incorporated by reference in its entirety), YSZ pillars and cavities, using an entirely organic-based ink (M. Mott et al., J Am Ceram Soc., 1999, 82(7), 1653-8, the contents of which is herein incorporated by reference in its entirety), gadolinium-doped ceria (CGO), lanthanum strontium manganite (LSM) (C. Wang et al., J. Eur. Ceram. Soc. 2012, 32, 2317, the contents of which is herein incorporated by reference in its entirety) and lanthanum strontium cobalt ferrite (LSCF) (T. Y. Hill et al., ECS Journal of Solid State Science and Technology 2015, 4, P3015, the contents of which is herein incorporated by reference in its entirety), but has not been employed to produce 3D scaffolds. These are defined as having a back-bone electrolyte phase with reproducible geometry, with the electronically conducting phase incorporated therein either by infiltration techniques for precursor solutions, or (co)printing by an additive manufacturing technique.

Inks typically employ an organic solvent in which to disperse particles due to their relatively high viscosity and low surface tension, compared to water, ensuring printability, defined as the reproducible ejection of droplets with consistent geometry. However, such organic solvents have detrimental environmental and industrial impacts. Aqueous solvents are preferable commercially and environmentally, but have been avoided largely due to difficulty in formulating stable (to aggregation) dispersions and resultant cracking in printed structures during drying, due to capillary effects arising from the comparatively high surface tension of water. R. Dou et al., J. Am. Ceram. Soc., 2011, 94(11), 3787-92, the contents of which is herein incorporated by reference in its entirety, discloses an aqueous-based ink to deposit individual droplets as a single layer, with zero droplet overlap, onto solid substrates. However, mitigation of cracking and formation of a gas-tight layer when printed as planes (as required for electrolyte layers) was not achieved. Moreover, this ink was not sintered and the high organics content could result in porosity in sintered structures, decreasing electrochemical performance.

Thus, there still remains a need for satisfactory aqueous ink compositions for fabricating functional layers of SOFCs and SOEs with high reproducibility.

SUMMARY OF INVENTION

In a first aspect, the invention provides an aqueous ink composition comprising:
  an aqueous solvent;
  particles comprising a metal or a metal compound or a mixture thereof;
  a dispersant, preferably selected from an electrostatic dispersant, a steric dispersant, an ionic dispersant, a non-ionic dispersant or a combination thereof;
  a polymeric binder; and
  a non-ionic surfactant.

The following discussion of the aqueous ink composition in relation to the first aspect of the invention applies mutatis mutandis to the second to eighth aspects of the invention.

The metal compound may be a metal oxide. Thus, the particles may comprise a metal or a metal oxide or a mixture thereof, preferably a metal oxide. The particles may comprise zirconium, yttrium, lanthanum, strontium, manganese, nickel, cobalt, cerium, gallium, silver or gadolinium or mixtures thereof, preferably an oxide of zirconium, yttrium, lanthanum, strontium, manganese, nickel, cobalt, cerium, silver or gadolinium or mixtures thereof. The particles may comprise yttria-stabilised zirconia (YSZ), lanthanum nickelates, lanthanum strontium manganite (LSM), lanthanum cobaltites (e.g. lanthanum strontium cobalt ferrite (LSCF)), gadolinium doped ceria (GDC), nickel oxide or silver oxide, or mixtures thereof. Preferably the particles comprise yttria-stabilised zirconia (YSZ), preferably wherein the particles consist essentially of YSZ. More preferably the particles comprise (preferably consist essentially of) 8 mol % yttria-stabilised zirconia. The particles may consist essentially of the metals, metal compounds or a mixture thereof, as described above.

The particles comprising a metal or a metal compound or a mixture thereof may have an average particle diameter about 1000 nm or less, about 100 to about 800 nm, preferably about 100 to about 750 nm, preferably about 100 to about 700 nm. Alternatively, the particles comprising a metal or a metal compound or a mixture thereof may have an average particle diameter about 300 to about 800 nm or about 400 to about 800 nm.

The dispersant may be an electrostatic dispersant, preferably wherein the electrostatic dispersant is a salt of a carboxylic acid, preferably an acrylic polymer (for example a sodium salt or an ammonium salt, preferably an ammonium salt), or a steric dispersant, preferably wherein the steric dispersant is polyvinylpyrrolidone. Moreover, the dispersant may be an ionic dispersant, or a non-ionic dispersant or a combination of any of the above dispersants. Preferably the dispersant is an electrostatic dispersant, preferably wherein the electrostatic dispersant is an ammonium salt of a carboxylic acid, preferably an ammonium salt of an acrylic polymer.

The polymeric binder may be a polyether. The polymeric binder may have a number average molecular weight of about 20000 to about 60000 Da. Preferably the polymeric binder is polyethylene glycol, preferably polyethylene glycol having a number average molecular weight of about 25000 to about 50000 Da.

The non-ionic surfactant may be an alcohol alkoxylate surfactant, preferably an alcohol ethoxylate surfactant.

The aqueous solvent may comprise at least 95% water (w/w). The aqueous solvent is preferably deionised water.

The aqueous ink composition may have a solids loading from about 1 to about 50 wt %, preferably from about 3 to about 30 wt %, calculated as wt % of the total aqueous ink composition (w/w). Therefore, the aqueous ink composition may comprise from about 1 to about 50 wt %, preferably from about 3 to about 30 wt %, of the metal or a metal compound. The dispersant may be present in the aqueous ink composition at an amount of about 0.1 to about 1 mg m$^{-2}$ of the surface area of the particles comprising a metal or a metal compound or a mixture thereof, preferably about 0.2 to about 0.8 mg m$^{-2}$. The polymeric binder may be present in the aqueous ink composition at a concentration of about 10 to about 50 mg cm$^{-3}$, preferably about 20 to about 40 mg cm$^{-3}$. The non-ionic surfactant may be present in the aqueous ink composition at a concentration of about 0.1 to about 0.5 mg cm$^{-3}$, preferably about 0.2 mg cm$^{-3}$.

The aqueous ink composition may have a dynamic viscosity of about 2 to about 20 mPa s, preferably about 4 to about 15 mPa s, calculated at 20° C. using a viscometer, for example a DV-E viscometer (Brookfield, UK). The aqueous ink composition may have a printability (Oh$^{-1}$) of about 1 to about 14, preferably about 4.5 to about 10. The aqueous ink composition may have a critical cracking thickness of at least 10 μm, preferably at least 15 μm.

In a second aspect, the invention provides a method of preparing an aqueous ink composition as described herein comprising the steps of:
 (a) providing an aqueous solvent and adding a dispersant to the aqueous solvent;
 (b) dispersing particles comprising a metal or a metal compound or a mixture thereof in the aqueous solvent; and
 (c) adding a polymeric binder and a non-ionic surfactant to the aqueous dispersion.

The dispersant is preferably selected from an electrostatic dispersant, a steric dispersant, an ionic dispersant, a non-ionic dispersant or a combination thereof.

Preferably step (b) is carried out after step (a). The method preferably further comprising the step of concentrating the aqueous dispersion by removal of the aqueous solvent before adding the polymeric binder and the non-ionic surfactant. The method may also comprise the step of centrifugation and/or filtration of the aqueous dispersion of step (b) to remove larger particles comprising a metal or a metal compound or a mixture thereof before adding the polymeric binder and the non-ionic surfactant. The particles comprising a metal or a metal compound or a mixture thereof may be dispersed in the aqueous solvent by sonication.

In a third aspect, the invention provides the use of the aqueous ink composition described herein as an ink for 3D printing, preferably 3D inkjet printing.

In a fourth aspect, the invention provides the use of the aqueous ink composition described herein as an ink for printing a component of an electrical device, preferably the electrolyte phase or an electrode of a solid oxide electrochemical device, preferably an electrochemical reactor, preferably a solid oxide fuel cell or a solid oxide electrolyser or a membrane. The aqueous ink composition described herein may be used to print an individual component of an electrical device (for example an electrolyte phase or an electrode) which may then be used to form the electrochemical device or aqueous ink composition described herein may be used to print a component of an electrical device by printing the component in situ (for example, by printing an electrolyte phase directly onto an electrode).

In a fifth aspect, the invention provides a method of producing a printed article comprising the steps of:
 (a) providing a substrate;
 (b) printing the aqueous ink composition described herein onto the substrate to form a printed article; optionally
 (c) drying the printed article; and optionally
 (d) heat treating the printed article.

The method may further comprise the step of preparing an aqueous ink composition according to the second aspect of the invention, prior to step (b).

The step of printing the aqueous ink composition may comprise printing one or more layers of the aqueous ink composition on the substrate to a thickness of about 1 to about 500 μm. The step of printing the aqueous ink composition may comprise printing a 3D microstructure (for example, a micropillar) of the aqueous ink composition. The critical cracking thickness of the printed aqueous ink composition may be at least 10 μm, preferably at least 15 μm.

After printing the structures may be dried and then optionally heat treated. The drying may be according to methods known in the art. Drying may be in air or in a convective oven with or without humidity control.

The step of heat treating the printed article may comprise heating the ink to at least about 400° C., to remove the organic phase, preferably between about 400 and about 700° C. Preferably, the heat treatment comprises heating the ink at about 600° C.; the actual temperature and rate of heating can be determined by thermo-gravimetric analysis. Preferably the heat treatment may further comprise a sintering step. The sintering step may comprise heating the ink to about 1000 to about 1800° C., preferably about 1000 to about 1500° C. The sintering step may be carried out sequentially or separately to the initial heat treatment step. For example, two or more layers of an aqueous ink composition are printed, wherein each layer may be heat treated and then the printed layers may be co-sintered.

The substrate may be an electrode in a solid oxide fuel cell or a solid oxide electrolyser, and the aqueous ink composition may be used to print the electrolyte phase of the solid oxide fuel cell or solid oxide electrolyser. The aqueous ink composition may also be used to print the electrode, which may then be used as a substrate to print the electrolyte phase or the aqueous ink composition may be used to print the electrode on the electrolyte phase.

In a sixth aspect, the invention provides an article obtainable by printing an aqueous ink composition as described herein or as produced by a method according to the fifth aspect of the invention. The article may be a component in a solid oxide electrochemical device, preferably a reactor, preferably a solid oxide fuel cell, a solid oxide electrolyser or a membrane.

In a seventh aspect, the invention provides a solid oxide electrochemical device comprising an article obtainable by printing an aqueous ink composition as described herein or as produced by a method according to the fifth aspect of the invention, preferably wherein the solid oxide electrochemical device is a solid oxide fuel cell or a solid oxide electrolyser.

In an eighth aspect, the invention provides a method of producing a solid oxide electrochemical device comprising the step of printing an aqueous ink composition as described herein or as produced by a method described herein, preferably wherein the solid oxide electrochemical device is a solid oxide fuel cell or a solid oxide electrolyser.

Embodiments described herein in relation to the first aspect of the invention apply mutatis mutandis to the second to eighth aspects of the invention.

DETAILED DESCRIPTION OF INVENTION

Figure 1:
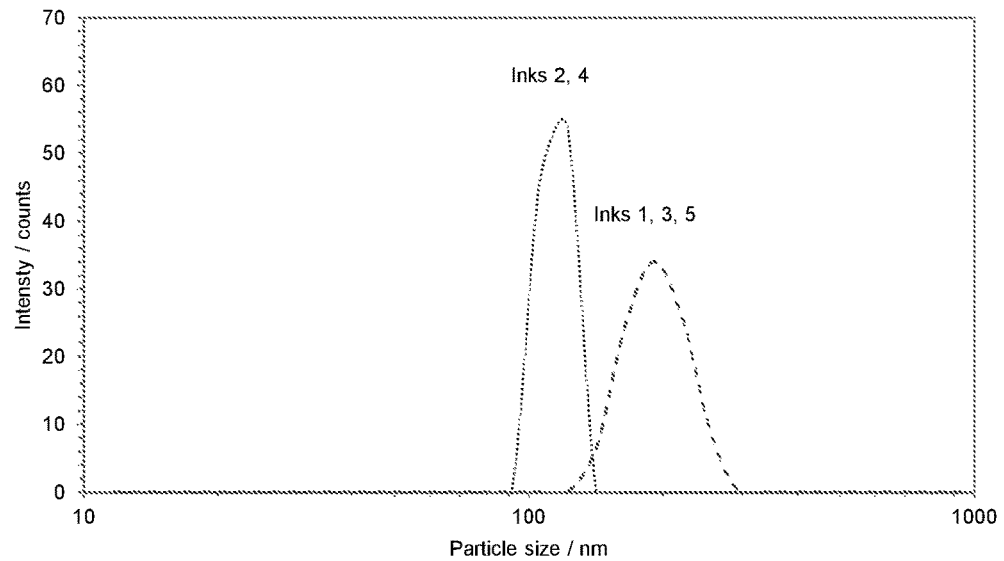
FIG. 1 shows particle size distribution profiles for formulated yttria-stabilised zirconia Inks 1-5, the compositions of which are shown in Table 1.

Herein is disclosed a technique for formulating colloidally stable and printable aqueous inks compositions that are employed to print reproducible planar and 3D microstructures for electrochemical devices. Such printed structures are particularly useful as the electrolyte phase in SOFCs.

Accordingly, in a first aspect, the invention provides an aqueous ink composition comprising:
an aqueous solvent;
particles comprising a metal or a metal compound or a mixture thereof;
a dispersant, preferably selected from an electrostatic dispersant, a steric dispersant, an ionic dispersant, a non-ionic dispersant or a combination thereof;
a polymeric binder; and
a non-ionic surfactant.

The aqueous ink composition of the invention comprises a colloidal dispersion of particles comprising a metal or a metal compound or a mixture thereof in an aqueous solvent. This aqueous ink composition may be essentially colloidally stable to aggregation. Any aggregates that may form may be dispersed by ultrasonication. The stability of aqueous ink composition of the invention may be quantified by measuring the zeta potential, the surface charge, or the particle size distribution over time of the ink composition, in accordance with standard protocols in the art.

As used herein, an aqueous solvent is a solvent that comprises at least 95% water (w/w). Preferably the aqueous solvent is deionised water. Preferably, the pH of the aqueous solvent is in the region of thermodynamic stability of the dispersed particles comprising a metal or a metal compound or a mixture thereof. For example, for an ink comprising particles comprising gadolinium doped ceria, LSM and/or LSCF, an aqueous solvent at about pH 9-10, or higher, would be preferable, subject to the pH constraint imposed by the printhead material, and for an ink comprising particles comprising yttria-stabilised zirconia, an aqueous solvent at about pH 7 would be preferable.

The particles comprising a metal or a metal compound or a mixture thereof preferably comprise zirconium, yttrium, lanthanum, strontium, manganese, nickel, cobalt, cerium, silver or gadolinium or mixtures thereof. These particles may be particles of a ceramic material, for example a metal oxide. Preferably the particles comprise oxides of zirconium, yttrium, lanthanum, strontium, manganese, nickel, cobalt, cerium, silver or gadolinium or mixtures thereof. Exemplary materials for the particles include yttria-stabilised zirconia (YSZ), lanthanum nickelates, lanthanum strontium manganite (LSM), lanthanum cobaltites (e.g. lanthanum strontium cobalt ferrite (LSCF)), gadolinium doped ceria (GDC), nickel oxide or silver oxide, or mixtures thereof. Preferably the particles are particles of yttria-stabilised zirconia, preferably 8 mol % yttria-stabilised zirconia (a material comprising a compound of formula $(Y_2O_3)_{0.08}(ZrO_2)_{0.92}$).

The particles may have an average particle diameter of about 1000 nm or less, preferably about 100 to about 800 nm. The particles comprising a metal or a metal compound or a mixture thereof may, preferably, have an upper particle size limit of about 2% of the diameter of the printhead nozzles used to print the aqueous ink composition, for example if the nozzle is 50 micrometres in diameter, the maximum particle size that may be ejected is about 1 μm.

As used herein, average particle size refers to the modal value of a particle size distribution, for example the modal intensity count value of a distribution of particle sizes measured by dynamic light scattering (DLS) using a light scattering detector, for example that of a Zetasizer μV instrument (Malvern, UK). Intensity counts are the first order output for samples measured by dynamic light scattering (DLS) using a light scattering detector. For example, in FIG. 1, the distribution of particle sizes in inks 1 to 5 is shown, where the average particles size for the particles in each ink is the modal intensity count value of the distribution.

For example, particle sizes may be determined by diluting a dispersed particle sample in an aqueous solvent sufficiently to allow DLS to be applied, using a Zetasizer μV instrument (Malvern, UK).

Ultrasonication may be carried out on the particles comprising a metal or a metal compound to break up aggregates and narrow the particle size distribution, improving the dispersion properties.

The aqueous ink composition of the invention may have a solids loading from about 1 to about 50 wt %, preferably from about 3 to about 30 wt %. The solids loading is calculated as a weight % of the particles comprising a metal or a metal compound or a mixture thereof of the total weight of the ink composition (including the solvent), so represents the proportion of the ink composition made up of the metal or a metal compound.

A dispersant is included in the aqueous ink composition to electrostatically and/or sterically stabilise the dispersion of the particles comprising a metal or a metal compound or a mixture thereof, for example by inducing a surface charge on the particles. This dispersant may form a functional layer on the surface of the particles comprising a metal or a metal compound or a mixture thereof.

The dispersant may be an electrostatic dispersant, preferably wherein the electrostatic dispersant is a salt of a carboxylic acid (e.g. an acrylic polymer), or a steric dispersant, preferably wherein the steric dispersant is polyvinylpyrrolidone. Moreover, the dispersant may be an ionic dispersant or a non-ionic dispersant. The dispersant may be a combination of any of the above dispersants. Preferably the dispersant is an electrostatic dispersant or a steric dispersant or a combination thereof. Preferably an electrostatic dispersant, wherein the electrostatic dispersant is an ammonium salt of a carboxylic acid (for example, an acrylic polymer).

An electrostatic dispersant is a compound that may adsorb to the surface of a substrate and induce an electrical charge of the surface of the substrate. Preferably an electrostatic dispersant itself has an electrical charge (i.e. is an ionic dispersant) and may transfer the charge to the substrate. An exemplary charged group that may be present in an electrostatic dispersant to give the dispersant an electrical charge is a carboxylate group (i.e., a —COO⁻ group). It will be appreciated that a compound comprising a carboxylate group may be provided as a salt (preferably an ammonium salt). An electrostatic dispersant is preferably a compound having a number average molecular weight of less than about 10000 Daltons (Da), preferably less than about 8000 Da, preferably less than about 6000 Da. Accordingly, an electrostatic dispersant is preferably a compound having a number average molecular weight of less than about 8000 Da (preferably less than about 6000 Da or less than about 4000 Da) and comprising one or more carboxylate groups, preferably two or more carboxylate groups, preferably three or more carboxylate groups. Preferably an electrostatic dispersant is a polymer having charged groups in side chains (a polyelectrolyte), for example a poly carboxylic acid.

An electrostatic dispersant having at least one carboxylic acid functionality may be used in the ink composition. To avoid acidic conditions in the ink, the electrostatic dispersant is the salt of the corresponding carboxylic acid. The nature of the counter ion of the carboxylic acid salt electrostatic dispersant should be removed during heat treatment. The electrostatic dispersant is preferably an ammonium salt of an acrylic polymer, so the counter ion is ammonium. As used herein, an acrylic polymer (used interchangeably herein with polyacrylic acid) refers to a polymer comprising a plurality of repeat units:

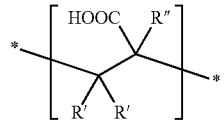

or a salt thereof, wherein each of R' and R" is independently H or $C_{1-6}$ alkyl. Preferably each R' is H and each R" is H or $C_{1-6}$ alkyl (preferably methyl), preferably H. The polymer preferably comprises at least 10, at least 20, at least 50, at least 100 repeat units or at least 200 repeat units. A polymer may be terminated by any group, for example hydrogen. The polymer may be a homopolymer or a copolymer comprising two or more different repeat unit structures. Preferably the polymer may have a number average molecular weight of about 1000 to about 10000 Daltons (Da), preferably about 1000 to about 4000 Da, preferably about 2000 to about 6000 Da, preferably about 2000 to about 4000 Da, preferably about 4000 Da.

Preferably the dispersant is Dispex® A40 (Ciba-BASF), an ammonium salt of a polyacrylic acid.

A polyacrylic acid, or a salt thereof, may be a polymer formed from monomers of structure

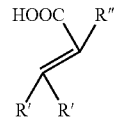

or a salt thereof (for example, an ammonium salt), wherein R' and R" are as described above.

An electrostatic dispersant may be a salt (for example, an ammonium salt) of a compound comprising one or more optionally substituted benzoic acid moieties, preferably two or more, preferably wherein the one or more or two or more optionally substituted benzoic acid moieties are linked by conjugation. For example, an electrostatic dispersant may be an ammonium salt of aurintricarboxylic acid (aluminon). Aluminon has the structure:

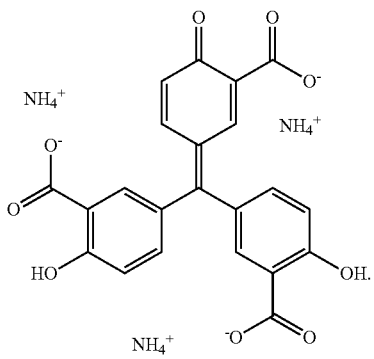

Further electrostatic dispersants that may be used in the ink composition include: Duramax™ D3005 (DOW Chemicals), an aqueous ammonium salt of a polyacrylic acid having a number average molecular weight of about 2400 Da; and DISPERBYK-2012 (BYK Additives, Ltd) an aqueous block copolymer comprising poly(meth)acrylate units having both amine and acid value of 7 mg KOH $g^{-1}$.

Electrostatic dispersants as described herein are particularly advantageous in the ink composition of the invention as they are easily removed from the printed ink composition during the heat treatment step.

Alternatively, a steric dispersant may be used in the ink composition. The steric dispersant may be polyvinyl pyrrolidone (PVP), preferably having a number average molecular weight of about 8000 to about 50000 Daltons (Da), preferably about 40000 Da.

A steric dispersant is a compound of high molecular weight (for example, a polymer) that may adsorb to the surface of a substrate to create steric interaction between neighbouring substrates. A compound of high molecular weight as used herein may refer to a compound having a molecular weight of at least about 8000 Da. Preferably a steric dispersant is a non-ionic dispersant.

The dispersant may, alternatively, be a combination of ionic and non-ionic dispersants. An exemplary combination of ionic and non-ionic that may be used in the aqueous ink composition of the invention may be an aqueous mixture of ionic and non-ionic surfactants, which may be free of alkylphenol ethoxylates (APEO). For example, Dispex® FA Ultra 4416 (BASF) may be used, which may comprise N,N-bis(2-hydroxyethyl)oleamide, N,N-bis(hydroxyethyl) C12-18 amides, poly(oxy-1,2-ethanediyl),alpha-hydro-omega-hydroxy-, mono-C12-14-alkylethers (and phosphates thereof), 2-amino-2-methylpropanol and 2,2'-iminodiethanol.

For aqueous ink compositions of the invention where the particles comprising a metal or a metal compound or a mixture thereof comprise (preferably consist essentially of) yttria-stabilised zirconia or gadolinium doped ceria, the dispersant may preferably be an electrostatic dispersant, preferably an ammonium salt of an acrylic polymer, preferably Dispex® A40 (Ciba-BASF). For aqueous ink compositions of the invention where the particles comprising a metal or a metal compound or a mixture thereof comprise (preferably consist essentially of) lanthanum strontium cobalt ferrite, the dispersant may preferably be a combination of ionic and non-ionic dispersants, preferably Dispex® FA Ultra 4416 (BASF). For aqueous ink compositions of the invention where the particles comprising a metal or a metal compound comprise or a mixture thereof (preferably consist essentially of) lanthanum strontium manganite, the dispersant may preferably be a steric dispersant, preferably PVP preferably having a molecular weight of about 40000 Da.

An electrostatic dispersant may be included in the ink composition at an amount of about 0.1 to about 1 mg $m^{-2}$ of the surface area of the particles comprising a metal or a metal compound or a mixture thereof, preferably about 0.2 mg $m^{-2}$ for aqueous ink compositions of the invention where the particles comprising a metal or a metal compound or a mixture thereof comprise (preferably consist essentially of) yttria-stabilised zirconia and about 0.8 mg $m^{-2}$ for aqueous ink compositions of the invention where the particles comprising a metal or a metal compound or a mixture thereof comprise (preferably consist essentially of) gadolinium doped ceria. A steric dispersant, for example PVP, may be included in the ink composition at a higher concentrations. For example, a steric dispersant may be included in the ink composition at an amount of about 10 to about 300 mg $m^{-2}$, preferably about 100 to about 150 mg $m^{-2}$.

To determine the required concentration of the dispersant, the specific surface area of the particles comprising a metal or a metal compound or a mixture thereof is determined. This may be done by Brunauer-Emmett-Teller (BET) surface area analysis, using adsorption and desorption techniques. For example, a Micrometrics 3Flex nitrogen adsorption apparatus (Canada) may be used to determine specific surface areas, first degassing the sample by applying a vacuum and heating to 200° C. The specific surface area of the particles comprising a metal or a metal compound or a mixture thereof may be about 5 to about 20 $m^2$ $g^{-1}$, preferably about 9 to about 12 $m^2$ $g^{-1}$.

A polymeric binder is used in the ink to adjust the viscosity to within a printable range. Desirable qualities in a polymeric binder are that it: 1) is non-adsorbing to the metal or metal compound, so it does not affect the packing of the particles during drying; 2) alters the viscosity significantly for a small amount added, to minimise the organics content of the ink; 3) maintains a Newtonian viscosity at concentrations sufficient to raise the viscosity into the printable range; and 4) does not reduce the dispersion stability. Preferably the polymeric binder is polyethylene glycol (PEG), preferably polyethylene glycol having a number average molecular weight of about 25000 to about 50000 Da. The polymeric binder may be present in the aqueous ink composition at a concentration of about 10 to about 50 mg $cm^{-3}$, preferably about 20 to about 40 mg $cm^{-3}$.

By increasing the molecular weight of the polymeric binder, the amount of polymeric binder needed in the aqueous ink composition can be reduced, for a given viscosity increase. For example, the aqueous ink composition preferably comprises about 20 to about 40 mg $cm^{-3}$ of polyethylene glycol having a number average molecular weight of about 35000 Da (i.e. $PEG_{35000}$).

The aqueous ink composition comprises a non-ionic surfactant to decrease the surface tension of the ink to within a printable range. The non-ionic surfactant should: 1) be non-adsorbing to the metal or metal compound, so it does not affect the packing of the particles during drying; 2) alter the surface tension significantly for a small amount added, to minimise the organics content of the ink; and 3) not reduce the dispersion stability. The non-ionic surfactant is preferably an alcohol alkoxylate surfactant.

As used herein, an alcohol alkoxylate is a compound of formula $R^a(OR^b)_nOH$, wherein $R^a$ and $R^b$ are each independently an alkyl group. $R^a$ constitutes the alcohol portion of the alcohol alkoxylate and $R^b$ constitutes the alkoxylate. $R^b$ is preferably $C_{1-6}$ alkyl, preferably $C_2$ alkly, i.e. an alcohol ethoxylate, $R^a(OC_2H_4)_nOH$.

Preferably the non-ionic surfactant is an alcohol ethoxylate surfactant, for example, Natsurf™ 265 (Croda, UK), an environmental surfactant derived from natural primary alcohols. An alcohol ethoxylate surfactant may have a hydrophilic-lipophilic balance of about 13 to about 14. The hydrophilic-lipophilic balance of Natsurf™ 265 is 13.6. The hydrophilic-lipophilic balance of a surfactant is a measure of the degree to which it is hydrophilic or lipophilic, determined by calculating values for the different regions of the molecule, as described in W. C. Griffin, J. Soc. Cosmetic Chemists, 1949, 1(5), 311-26, the contents of which is herein incorporated by reference in its entirety.

Alcohol ethoxylates may be produced by the reaction of ethylene oxide with fatty alcohols. The alcohol reacts with ethylene oxide at the hydroxyl group to provide an ether linkage and a new hydroxyl group. Generally, the starting alcohol will have a distribution of alkyl chain lengths and the resulting ethoxylate will, therefore, have a distribution of ethylene oxide chain lengths.

The aqueous ink composition of the invention may be a Newtonian fluid having Newtonian rheological behaviour, i.e. viscosity independent of shear rate, shear history or time. This is preferable as shear rates in inkjet printer nozzles may be high. In addition, thixotropy would make the process very hard to reproduce and so is preferably avoided. The aqueous ink composition of the invention may have a dynamic viscosity of about 2 to about 10 mPa s, preferably about 4 to about 5 mPa s, measured at 20° C. Dynamic viscosity may be measured using a viscometer, for example a DV-E viscometer (Brookfield, UK), at 20° C. and 1 atmosphere (0.1 MPa).

The aqueous ink composition of the invention may have a printability metric, the dimensionless inverse Ohnesorge number ($Oh^{-1}$) of about 1 to about 14, preferably about 4.5 to about 10, preferably about 8.5 to about 9.5. The Ohnesorge number (Oh) is a dimensionless number that represents the ratio of viscous forces to inertia and surface tension. Printability is defined as the reliable ejection of droplets, with reproducible geometry, minimising satellite formation (non-spherical and fragmented droplets), and splashing on the substrate (the material onto which the ink is deposited) that would cause deposition of un-reproducible and unpredictable structures. The printability of ceramic inks has been investigated over the last decade, resulting in an empirical range of physical properties for a stable colloidal dispersion, as outlined in B. Derby, J. Eur. Ceram. Soc. 2011, 31, 2543, the contents of which is herein incorporated by reference in its entirety. This is defined in the equations below $$Re = \frac{\rho u_0 r}{\eta}; We = \frac{u_0^2 \rho r}{\gamma}; Oh = \frac{\sqrt{We}}{Re} = \frac{\eta}{\sqrt{\gamma \rho r}}$$

where $\rho$ represents ink density, $u_0$ droplet ejection velocity (usually between about 1 and about 5 m s$^{-1}$), r diameter of printer nozzle (usually between about 20 and about 70 μm), $\eta$ ink viscosity, and $\gamma$ ink-air surface tension. The density can be measured, for example, by weighing a set volume of the ink. The diameter of the printer nozzle can be measured by optical inspection, i.e. a microscope. Viscosity can be measured using a viscometer as described above, and Newtonian behaviour can be confirmed by altering the shear rate and monitoring any changes that occur over time. Surface tension can be measured using a capillary tensionometer using a 250 mm long borosilicate glass capillary tube of 0.5 mm nominal internal diameter at 1 atm (0.1 MPa) and 20° C.

The aqueous ink composition of the invention may be prepared by providing particles comprising a metal or a metal compound or a mixture thereof and dispersant at an amount required to give the aqueous ink composition with the desired solids loading and dispersant concentration. The dispersant may be dissolved in the aqueous solvent to form a solution. The particles comprising a metal or a metal compound or a mixture thereof may then be added to the solution and ultrasonicated, for example directly with an ultrasonic probe to form a dispersion. Ultrasconication may disperse the particles and break up aggregates. Alternatively, the particles comprising a metal or a metal compound or a mixture thereof may be dispersed in the aqueous solvent and then the dispersant may be added to the resulting dispersion.

Larger particles comprising a metal or a metal compound or a mixture thereof may be removed, for example by centrifugation and/or filtration (using for example a membrane or filter). Preferably particles larger than 800 nm are removed. These particles are preferably removed by centrifugation. Centrifugation may also narrow the particle size distribution so that the particles pack closer together in the printed structures. This results in an increased final density of the structures and hence reduced resistance, as porosity is lower (Bruggeman adjusted). Therefore, electrochemical performance is maximised.

The aqueous dispersion may then be concentrated to the desired solids loading, for example by removal of solvent by evaporation. Ideally, the temperature of the dispersion should not exceed about 80° C., to avoid loss of the dispersant. After concentrating to the desired solids loading, as determined by measuring the density of the dispersion, the total volume was measured and the polymeric binder may be added at the desired concentration and dissolved.

Prior to printing, the surfactant may be added at the desired concentration and dissolved to tailor the surface tension of the aqueous ink composition. Preferably, the surfactant may be added immediately prior to printing.

Rheological properties of the aqueous ink composition of the invention enable its use for production of three dimensional printed articles. The ink composition is preferably for use in 3D printing and is of particular use in 3D inkjet printing. The aqueous ink composition may be printed onto a substrate. Preferably the substrate is an electrode and the aqueous ink composition is used to print the electrolyte phase (or layer) onto the surface of the electrode or for printing an electrode. The aqueous ink composition may be printed as a layer (for example, a film) on the surface of a substrate of a thickness of about 1 to about 2000 μm. This layer may be built up by printing multiple (for example, up to 200, i.e. from 2 to 200) separate layers and drying each printed layer between each print. Advantageously, the aqueous ink composition of the invention may be used to print a three dimensional microstructures on a substrate. Again, this 3D microstructure may be built up by printing successive layers. The aspect ratio of a printed structure (height to width) may be up to about 8.

The printing of such 3D microstructures on the substrate allows for the reproducible fabrication of electrolyte phases or electrodes for solid oxide fuel cells or electrolysers with control of the triple phase boundaries. Such microstructures include, for example micro-pillars in an array and lattices. Using the aqueous ink composition of the invention microstructures having minimum feature resolution in the x-y (horizontal) plane of 35 µm and in the z-direction of 1.2 µm may be achieved.

The electrochemical device produced by printing the aqueous ink composition of the invention to form the electrolyte phase may be operated with $H_2O$, $CO_2$, $H_2$, $CO$ or a hydrocarbon, such as methane, or a mixture thereof.

The aqueous ink composition of the invention may be printed onto a substrate to give a structure which preferably has a critical cracking thickness of at least about 10 µm (for example, by a method of printing as described herein), preferably at least about 15 µm. The critical cracking thickness ($H_{crit}$), the film depth below which cracking does not occur, provided by an ink depends on the shear modulus of the particles comprising a metal or metal compound or a mixture thereof (G), the particle packing density ($\phi$), coordination number (N), particle radius (R), Poisson ratio (v), and the surface tension of the ink ($\gamma$), according to the equation below:

$$\frac{H_{crit}}{R} = 0.050 \left( \frac{GN\phi R}{2\pi(1-v)\gamma} \right)^{2/3}$$

For the purposes herein, the critical cracking thickness resulting from printing of an aqueous ink composition of the invention may be referred to as the critical cracking thickness of the aqueous ink composition of the invention.

Measurement of the shear modulus may be carried out by any method known to a skilled person in the art.

Packing density can be measured by calculating the porosity of the ink once it has dried. This can be done for example, by density methods by measuring thickness by optical profilometry, using a Veeco Wyko NT911 machine (Brucker, USA) at 5× objective zoom with 2× field of vision (FOV) view. The threshold modulation was 0.1%, backscan was 100 µm, and scan length was 100 µm. The VSI primary filter was used. 8 thickness samples were taken from printed square layers. To convert the resulting thickness data into packing fraction, the thickness of 10 printed (non-heat treated) layers and 5 printed layers can be calculated, and then the thickness of 5 subtracted from the thickness of 10, to eliminate any effects from the first printed layer. Knowing the thickness of 5 printed layers, and also the mass of deposited solids, from the ink, and therefore the volume of deposited solids (from the particle density), the volume fraction of solids, and hence the packing density, can be calculated.

The coordination number may be measured by transmission electron microscopy (TEM) as it is essentially the number of particles with which each particle is in contact. Poisson ratio may be measured by any method known to a skilled person in the art. Surface tension can be measured using a capillary tensionometer as described above. Particle radius may be measured by dynamic light scattering, as outlined for particle size measurement above.

The thickness of a single dried printed layer (H) should be lower than $H_{crit}$, as when printing isolated droplets (i.e. narrow structures in the x-y plane) the rate of evaporation (E) is high, and therefore the ability to mitigate cracking is determined by the condition: $H<H_{crit}$. At low E, cracking may be avoided at $H>H_{crit}$. Therefore, assisted drying is not preferable at $H\approx H_{crit}$.

The aqueous ink composition of the invention may be used for printing in a piezoelectric inkjet printer. The voltage, frequency and duration of pulses to the piezoelectric printhead nozzles may be optimised with respect to active nozzles, droplet geometry, and droplet volume. Preferably the printhead nozzle has a diameter of for example, about 10 to about 500 µm, preferably about 20 to about 100 µm, preferably about 20 to about 50 µm.

Between printing successive layers, a drying time may be provided, for example ranging between about 5 seconds and 10 minutes depending on the structure. This helps to mitigate cracking.

Between printing successive layers, a nozzle purge may be carried out to flush the nozzles with fresh ink. This may reduce the extent of nozzle clogging resulting from dried ink in the nozzles or aggregate formation in the nozzles, blocking them, maximizing the number of active nozzles which reduces the probability of defects in the printed structure resulting from inactive (i.e. non-ejecting) nozzles.

The printer may be set up to print more than one phase (for example, two to three) simultaneously, for example, two or more aqueous ink compositions or the aqueous ink composition and also a UV-curable monomer and carbon particle ink (which may be cured in-situ by a UV lamp). Printing two or three phases simultaneously allows more complex 3D structures to be fabricated, as the UV cured polymer ink can provide a support on which to print the aqueous ink composition. The curable polymer can be cured after each layer or at the end of printing, or not at all, by a UV lamp with adjustable power intensity and scan velocity. Examples of possible structures derived from simultaneous printing of two phases are arch structures/scaffolds/overhangs and cavities.

After printing the structures may be dried and then optionally heat treated. The drying may be according to methods known in the art. Drying may be in air or in a convective oven with or without humidity control.

The heat treatment may comprise heating the printed ink to at least about 400° C., to remove the organic phase, preferably between about 400 and about 700° C. Preferably, the heat treatment comprises heating the printed ink at about 600° C. optionally for between about 1 and about 5 hours, as determined by Thermo gravimetric analysis (TGA). Heat treatment may be carried out by exposing the ink to infra-red light. Preferably the heat treatment may further comprise a sintering step. The sintering step may comprise heating the ink to about 1000 to about 1800° C., preferably about 1000 to about 1500° C., preferably about 1200 to about 1500° C.

The sintering step may be carried out sequentially or separately to the initial heat treatment step. For example, if two separate layers of an aqueous ink composition are printed, each layer may be heat treated and then both layers may be co-sintered as described above.

Preferably a first layer of an aqueous ink composition may be printed according to the methods described herein and then a second layer of an aqueous ink composition may be printed to form a barrier layer, electrolyte phase or electrode. These two layers may then be co-sintered according to the methods described herein. This allows the production of a component of an electrochemical device, for example an electrolyte phase, an electrode or a combination thereof.

The aqueous ink composition of the invention may also be used to produce an electrode. For example, a composite electrode may be fabricated either by concurrent or sequential deposition of one or more aqueous ink compositions (for example two or more) and optionally also a UV-curable monomer and/or carbon particle ink.

An electronic conducting phase may be printed as described herein using an aqueous ink composition of the invention as described herein comprising, for example particles comprising a metal or a metal compound or a mixture thereof comprising (preferably consisting essentially of) lanthanum strontium manganite and/or nickel and an ionic conducting phase may be printed as described herein using an aqueous ink composition of the invention as described herein comprising, for example particles comprising a metal or a metal compound or a mixture thereof comprising (preferably consisting essentially of) yttria-stabilised zirconia and/or gadolinium-doped ceria, leaving spaces for the 'void' or 'pore' phase. Alternatively, a mixed conducting phase (i.e. both ionic and electronic conducting phase) may be printed as described herein using an aqueous ink composition of the invention as described herein comprising, for example particles comprising a metal or a metal compound or a mixture thereof comprising (preferably consisting essentially of) lanthanum strontium cobalt ferrite. The electronic conducting phase and the ionic conducting phase and/or the mixed conducting phase may be printed concurrently or sequentially, for example, printing one phase, drying (and optionally heat treating) and printing a second phase and drying and optionally heat treating.

Alternatively, a sacrificial 'void' or 'pore' phase template (for example a UV-curable monomer and carbon particle ink) may also be printed concurrently or sequentially with the electronic and ionic conducting phases and/or the mixed conducting phase, which may be cured in-situ by a UV lamp and/or burned out during the heat treatment step, to leave the pore or void. Any UV-curable monomer and carbon particle ink that is standard in the art may be used.

A solid oxide electrochemical fuel cells or electrolyser may be fabricated using the aqueous ink composition of the invention. For example, the invention provides a method of producing an electrochemical reactor (preferably a solid oxide electrochemical fuel cells or electrolyser) comprising the steps of:
 (a) preparing an electrode substrate;
 (b) printing the aqueous ink composition described herein onto the electrode substrate to form an electrolyte phase; optionally
 (c) drying the printed structure, and optionally heat treating the printed article; and
 (d) applying a further electrode material to the surface of the electrolyte phase.

The electrode substrate is preferably the negative electrode of the electrochemical reactor. In a solid oxide fuel cell, this may be the fuel side electrode. It may be prepared by, for example, forming a slurry comprising nickel (preferably nickel oxide) and yttria-stabilised zirconia and/or gadolinium-doped ceria and then cast to form a NiO-YSZ/CGO substrate. Alternatively, the electrode may be printed using aqueous ink compositions of the invention as described herein.

The electrolyte phase may then be printed on the substrate using an aqueous ink composition as described herein.

Using such additive manufacturing techniques such as printing allows the formation of reproducible electrolyte phases with high control of the triple phase boundaries. For example, 3D structures may be printed using the aqueous ink compositions.

As described herein, the printed structure may then be dried and optionally heat treated (for example sintered).

A further electrode material (preferably the positive electrode) may then be applied to the dried printed structure. In a solid oxide fuel cell, this may be the air/oxygen side electrode. For example, a LSM-YSZ paste may be coated on the surface of the printed electrolyte and then allowed to dry. A further coating of LSM paste may then also be applied and dried. Alternatively, the electrode may be printed using aqueous ink compositions of the invention as described herein.

A final heat treatment may then be carried out as described herein.

Throughout the description and claims of this specification, the words "comprise" and "contain" and variations of the words, for example "comprising" and "comprises", mean "including but not limited to", and are not intended to (and do not) exclude other components.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

The present invention will now be explained in more detail by reference to the following non-limiting examples.

EXAMPLES

Example 1—Device Fabrication

Ink Fabrication

Dispex® A40 (Ciba-BASF, UK) was dissolved in deionized water at a concentration of 0.2 mg m$^{-2}$ of 8 mol % yttria-stabilized zirconia (YSZ) particles. Two sizes of YSZ particles were investigated, the larger from Sigma Aldrich, USA, and the smaller from Fuel Cell Materials, USA. The particles were then added and dispersed by direct exposure to an ultrasonic probe (Q55, 20 kHz, 6 mm Ti alloy tip, QSonica, USA) with three 3 minute bursts at 60% amplitude, and 3 minute cooling intervals between each. The resulting dispersions were stirred for 24 h, centrifuged at a relative centrifugal force (RCF) of 1350 for 2 minutes and then filtered to remove particles with a diameter exceeding 800 nm. Polyethylene glycol 35,000 (PEG 35000) (Sigma Aldrich, USA) was added to the filtrate and allowed to dissolve for 24 hours. Immediately prior to printing, the alcohol ethoxylate Natsurf™ 265 (Croda Chemicals, UK) was added at a concentration of 0.2 mg cm$^{-3}$ of the total volume of the ink and stirred until dissolved.

Substrate Fabrication

A NiO-YSZ slurry was prepared by mixing the constituent NiO and YSZ powders (Inframat Advanced Materials, USA) with polyethersulfone (PESf) (Radel A-300, Ameco Performance, USA) and polyethylene glycol 30-dipolyhydroxystearate (Arlacel P135, Uniqema, USA) in dimethyl sulfoxide (DMSO) (VWR, UK), in the mass ratios 120:80:25:2:100, respectively. Planar substrate sheets were tape casted, and a microstructure formed via a phase inversion process by soaking in a water bath for 24 hours. The resultant structures subsequently flattened and dried.

Printing

A CeraDrop X-Series piezoelectric drop-on-demand inkjet printer (Ceradrop, France) using a DIMATIX Sapphire QS-256/30 AAA printhead (Fujifilm, Japan) was used to deposit the dispersions onto the NiO-YSZ substrate. The diameter of the printhead nozzles was 52 μm (R. Noguera et al., J. Eur. Ceram. Soc., 2005, 25(12), 2055-9). The drying time between each printed layer for planar structures was 4 minutes at an ambient temperature of 26-28° C. The droplet deposition pattern was a square lattice (i.e. a coordination number of 4 for each droplet) for all printed structures, however droplet overlap varied between 20-40% (diameter overlap between coordinated pairs).

To print pillars, separate arrays of 50 and 180 layers height were printed directly onto the NiO-YSZ substrate, with 2 minute drying times between each successive layer. The pillar geometries corresponded to a mixture of single isolated droplets ('splats') and double splats overlapped at 67%. The square scaffold was printed directly onto the NiO-YSZ substrate with a droplet overlap of 50%.

The voltage pulse applied to the piezoelectric nozzles to fabricate all printed structures shown had a magnitude of 80 V, total pulse duration of 13 μs including an increase and decrease time of 2 and 5 μs, respectively, at a frequency of 2800-5000 Hz.

Sintering

The printed structures were rested at room temperature for 24 h. They were then heated at a rate of 4° C. min$^{-1}$ to 600° C., at which they were held for 6 hours under an air atmosphere (Elite Thermal Systems furnace, UK), then heated at a rate of 15° C. min$^{-1}$ to 1500° C., at which they were held for 10 hours, before being cooled at 4° C. min$^{-1}$ to room temperature.

Reactor Fabrication

Twelve layers of the aqueous ink composition were deposited onto the substrate. The printer settings were an 80 V pulse applied to the piezoelectric nozzles with a total pulse duration of 13 μs, including an increase and decrease time of 2 and 5 μs, respectively, at a frequency of 2.8-5 kHz. The printed layer and substrate were co-sintered, as above. A LSM-YSZ paste (Fuel Cell Materials, USA) was brush-coated on the electrolyte and allowed to dry at room temperature, followed by a coating of LSM paste (Fuel Cell Materials, USA). After drying, the cells were sintered at 1100° C. for 3 hours with a ramp rate of 4° C. min$^{-1}$ Example 2—Characterization Specific surface areas and porosities of metal or metal oxide powders (e.g. yttria-stabilized zirconia powders) were determined using a Micrometrics 3Flex machine (Canada), by applying Brunauer-Emmett-Teller (BET) theory. Before doing this, the sample of metal or metal oxide powder, about 300 mg, was degassed by applying a vacuum and heating to 200° C.

Average particle sizes were determined after formulating inks by diluting the dispersions in water sufficiently to allow dynamic light scattering to be applied, using a Zetasizer ρV instrument (Malvern, UK). A suitable dilution may be to about 1% solids (w/w). Transparent, disposable cuvettes were used, and measurements were taken in runs of 13 separate measurements per run.

Viscosities were measured with a DV-E viscometer (Brookfield, UK) after being stirred for 24 hours, and surface tensions were measured using a capillary tensiometer (Cole Parmer, USA). 16 ml samples were added to the concentric cylinder setup (stationary outer cylinder, rotating inner cylinder), where the spindle used was the Brookfield ULA spindle (code 00 on the viscometer). A number of measurements were taken in the torque range 10-100% for the viscometer to probe rheology.

Scanning electron microscopy was performed at 20 kV, 15 mm working distance with 10 nm chromium coating (JSM 6400, JEOL, USA) to image the structures.

Ink Characterization

Five different aqueous inks were formulated, varying the solids loading, particle size and polymer concentration (PEG 35000) to the compositions reported in Table 1, to investigate their effects on the fabricated structures. The physical properties of all formulations lay within the range of printability, i.e. 1<Oh$^{-1}$<10 (see B. Derby, J. Eur. Ceram. Soc. 2011, 31, 2543), where Oh represents the ratio of viscous forces to inertia and surface tension. Stability against aggregation was confirmed by the absence of sedimentation over a period of weeks.

TABLE 1

Physical properties and composition of the formulated inks (Inks 1-5). The ratio $D_m/D_i$ corresponds to the individual droplet resolution, i.e. the ratio of the maximum spread diameter of the droplet on the substrate ($D_m$), the so-called splat diameter, to the in-flight diameter ($D_i$).

| Ink | Viscosity/ mPa s | Surface tension/ mN m$^{-1}$ | Oh$^{-1}$ (—) | YSZ loading/ wt % | PEG 35000 concentration/ mg cm$^{-3}$ | Average Particle size/ nm | Specific surface area/ m$^2$ g$^{-1}$ | $D_m/D_i$ (—) |
|---|---|---|---|---|---|---|---|---|
| 1 | 4.7[a] | 24 | 8.5 | 24 | 25 | 194 | 9.2 | 1.6 |
| 2 | 4.1[b] | 24 | 9.1 | 20 | 25 | 115 | 10.8 | 1.7 |
| 3 | 8.8[a] | 25 | 4.4 | 10 | 40 | 194 | 9.2 | 1.8 |
| 4 | 7.5[a] | 25 | 5.1 | 10 | 40 | 115 | 10.8 | 2.7 |
| 5 | 4.2[a] | 28 | 9.2 | 3 | 30 | 194 | 9.2 | 2.8 |

[a]Newtonian viscosities;

[b]Shear shinning behaviour observed; the viscosity of 4.1 mPa s was that at an infinite shear rate, determined graphically.

An important parameter when formulating inks for inkjet printing of colloidally dispersed solids is particle size, as this should be sufficiently small to avoid blocking the nozzles during printing. The particle size distributions of the inks are shown in FIG. 1.

To calculate the Oh number, the viscosity of the inks had to be determined. However, at high solids loadings colloidal dispersions may be shear thinning, and therefore their viscosity variable; this was the case for Ink 2. The viscosity was determined over a range of shear rates, which are reported in Table 2. Shear rates in the nozzles are very large, and therefore the infinite-shear rate viscosity was calculated graphically as 4.1 mPa s, and used to approximate the viscosity in the nozzles

TABLE 2

The rheological behaviour of Ink 2.

| RPM | Torque/% | Ink 2 viscosity/ mPa s | Ink 2 shear rate/ $s^{-1}$ |
|---|---|---|---|
| 20 | 10.6 | 4.26 | 24.9 |
| 30 | 13.1 | 4.2 | 37.4 |
| 50 | 20.5 | 4.19 | 62.3 |
| 60 | 24.0 | 4.18 | 74.8 |
| 100 | 38.8 | 4.187 | 124.7 |

Crack Mitigation within Planar Structures

Figure 2:
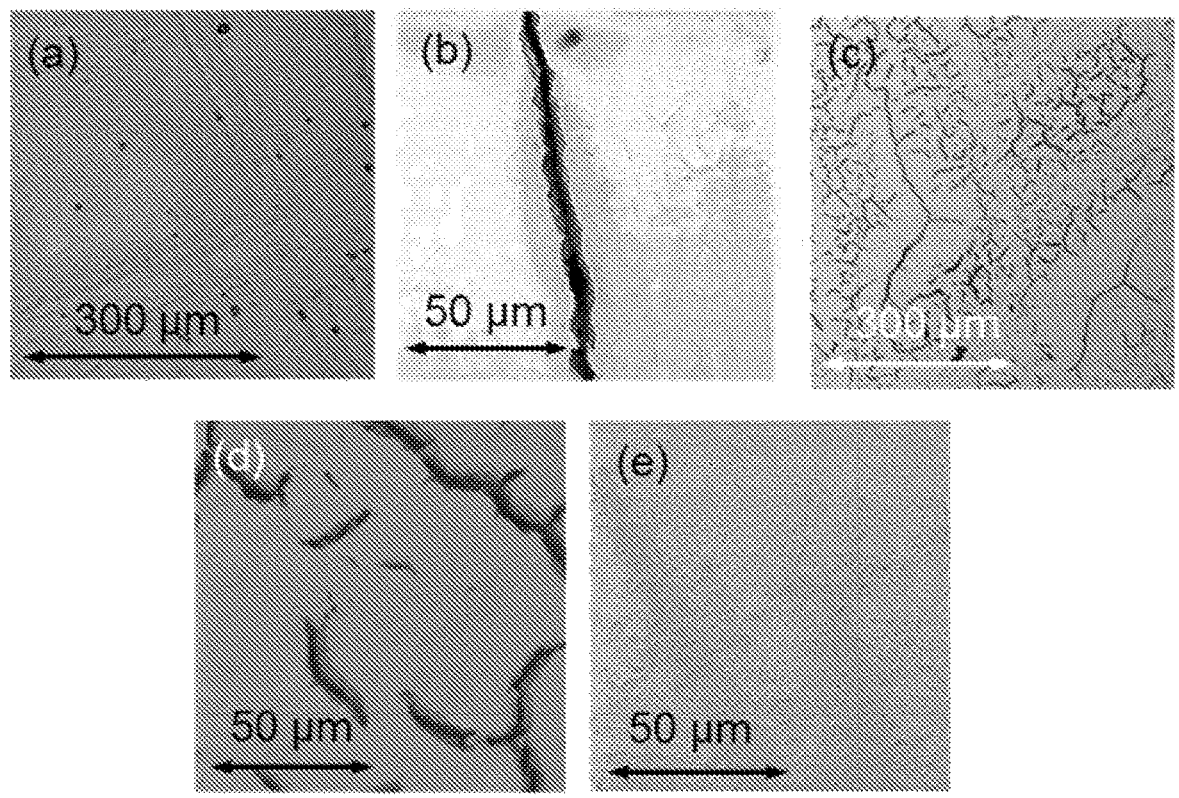
FIG. 2 shows SEM surface view images of sintered planar structures fabricated with (a) 12 layers of Ink 1, (b) 25 layers of Ink 2, (c) 16 layers of Ink 3, (d) 40 layers of Ink 4, and (e) 20 layers of Ink 5. Droplet overlap was 40% for Ink 1, and 20% for Inks 2-5.

Thin, gas-tight, planar structures of each ink were printed to assess their ability to resist cracking, which would otherwise create gas leaks in the sintered electrolyte phase or mechanical failure in complex microstructures. In the green films, cracks form during drying in response to a capillary pressure gradient throughout the film due to evaporation-driven flows that result from the relatively high surface tension of water. In initial printing experiments, Inks 1 and 5 resulted in planes that did not crack; however, Inks 2-4 cracked (FIG. 2).

The critical cracking thickness ($H_{crit}$), the film depth below which cracking does not occur, depends on the shear modulus of the YSZ particles (G), the particle packing density ($\phi$), coordination number (N), particle radius (R), Poisson ratio (v), and the surface tension of the ink ($\gamma$), according to the equation below.

$$\frac{H_{crit}}{R} = 0.050 \left( \frac{GN\phi R}{2\pi(1-v)\gamma} \right)^{2/3}$$

It is essential that the thickness of a single dried printed layer (H) is lower than $H_{crit}$, as when printing isolated droplets (i.e. narrow structures in the x-y plane) the rate of evaporation (E) is high, and therefore the ability to mitigate cracking is determined by the condition: H<$H_{crit}$. At low E, cracking may be avoided at H>$H_{crit}$. Assuming that the particles are spherical and assemble in a random close packing (RCP) arrangement in the printed film (i.e. N=6, $\phi$=0.6), this would indicate that the critical cracking thickness for Inks 1-5 is 18, 7, 17, 7, and 16 μm, respectively, using models to predict G and v and assuming a RCP arrangement (A. Selcuk et al., J. Eur. Ceram. Soc. 1997, 17, 1523, the contents of which are herein incorporated by reference in their entirety). In reality, $H_{crit}$ would be expected to differ from these values for some formulations for three reasons:

1) Particles were non-spherical and the average size did not represent all particles in the distribution.
2) Strong inter-particle interactions may cause aggregation, decreasing the particle packing fraction.
3) For printed layer number n, where n>1, the 'substrate' is a previously printed layer, and consequently it may be possible for cracks to enter the substrate, decreasing the structure's potential to withstand cracking, i.e. $H_{crit}$(n>1)<$H_{crit}$ (n=1) (T. Ye et al., International Journal of Solids Structures 1992, 29, 2639, the contents of which are herein incorporated by reference in theft entirety).

However, it was also evident that packing arrangement (N$\phi$) varied with organic additive composition, as cracking behaviour was inconsistent for constant R. This can be explained by considering the processes that occur during droplet drying. As the water evaporates, the particles (and polymer) are concentrated within the printed film. If the particles are brought sufficiently close together, they may overcome electrostatic repulsion and aggregate. In addition, if there is a free polymer present in the drying droplet, a depletion potential may be induced if its concentration is sufficiently high, and inter-particle separation sufficiently low (i.e. excluded volumes). The packing density within these aggregates ultimately determines the packing density within the printed films, if the inter-particle potentials are greater than the capillary pressure. As polymer concentration increases further during drying, a stabilization potential is induced, locking the particles in their existing arrangement.

Example 3—Printing 3-D Microstructures

Figure 3:
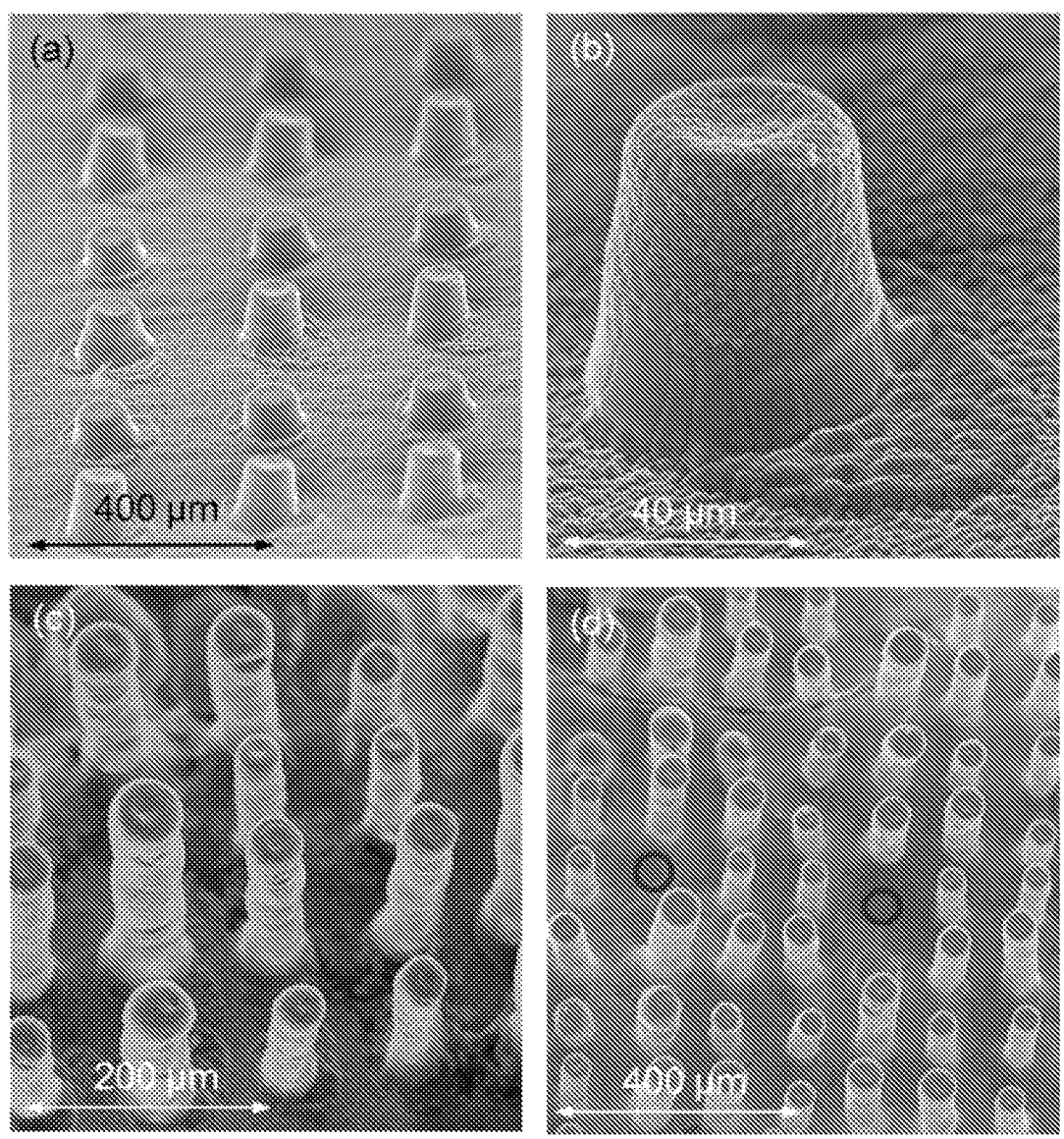
FIG. 3 shows SEM images of YSZ pillars on Ni-YSZ substrate (a) array of 50 layer pillars at 60° tilt, (b) showing the remnants of a misplaced droplet (red zone) and 50 layer pillar, (c) pillar array 180 layers tall (approx. 300 µm) at 30° tilt, and (d) pillar array showing missing pillars (darker circles) due to inactive nozzles.

Although Ink 5 formed a crack-free layer and was suited to printing ultra-thin films, Ink 1 was preferable, as solid deposition rates were 65 times faster for building microstructures. Using Ink 1, the minimum feature resolution achieved in sintered structures in the x-y (horizontal) plane was 35 μm, and in the z-direction 1.2 μm, the smallest reported feature resolution to-date, as shown in FIG. 3. The maximum height of structures was approx. 300 μm and the tops of the pillars were concave due to a mild 'coffee staining' effect.

Figure 4:
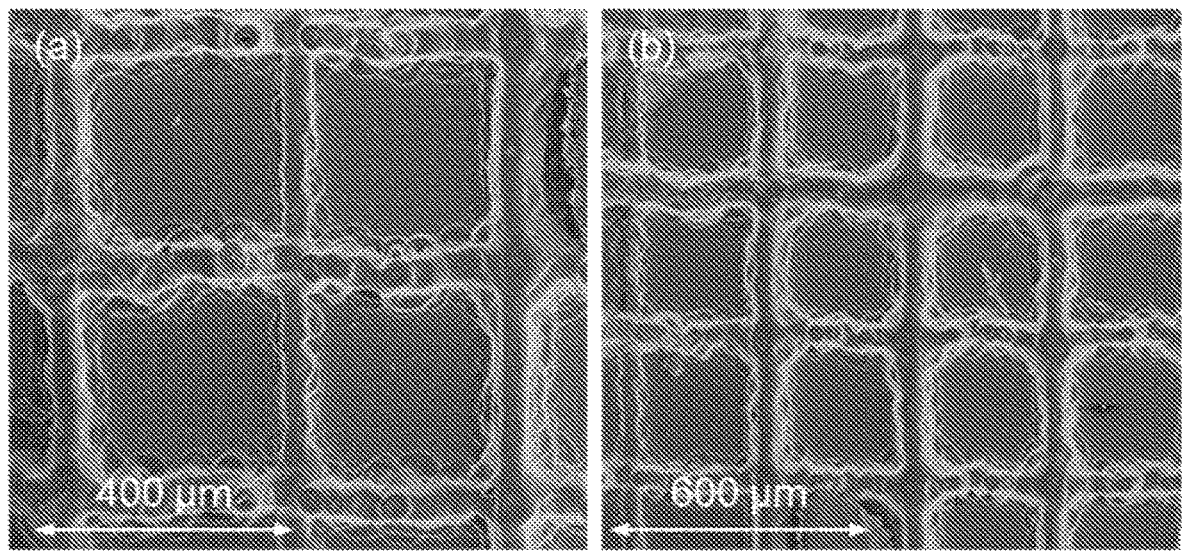
FIG. 4 shows SEM images of square scaffolds.

In addition, square scaffolds with a minimum feature-resolution of 40 μm were printed, demonstrating the technique's high degree of customization (FIG. 4). The packing fraction of YSZ in the green printed structures was 0.64, corresponding to random close packing, resulting in highly-dense sintered structures. Therefore, this validated the potential of using inkjet printing to fabricate 3D scaffolds that can be infiltrated post-sintering for use in SOFCs and SOEs.

Example 4—Electrochemical Behaviour

Current Collection, Sealing and Reactor Assembly

Figure 5:
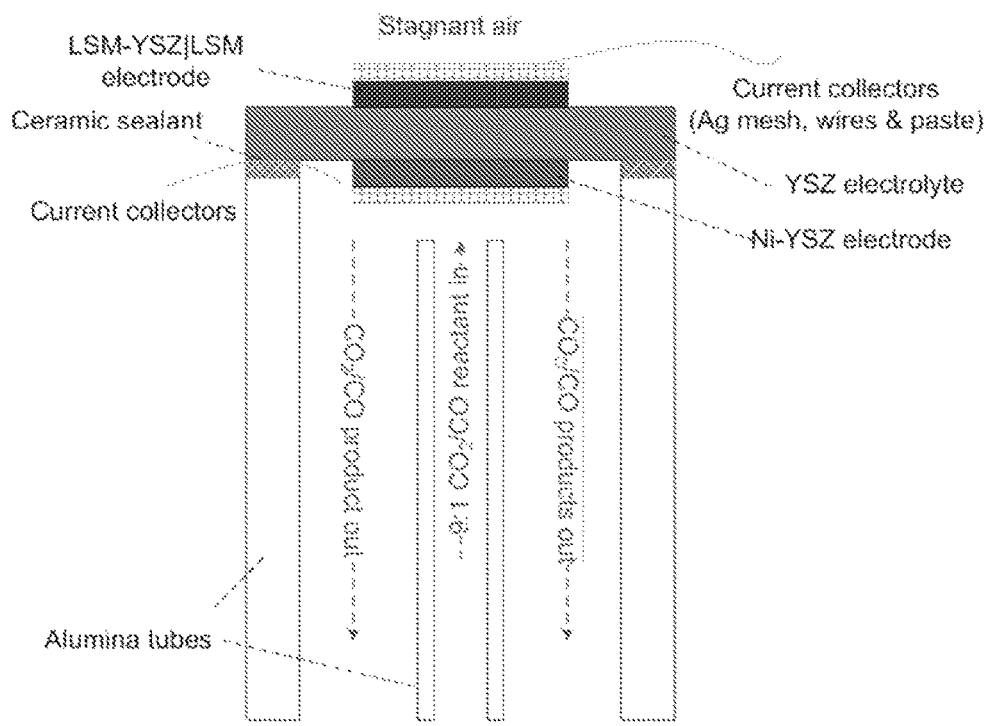
FIG. 5 shows a planar electrochemical cell experimental assembly

Current collection from the electrodes was via a silver mesh (80 mesh, woven from 0.115 mm diameter wire, Alfa Aesar, UK), silver paste (Alfa Aesar, UK) and silver wire (0.25 mm diameter, 99.9% purity, annealed, VWR International, UK). The cell was cemented to an alumina tube using a ceramic sealant (Aron Ceramic D, Aron Alpha Toagosei, USA). Gases were supplied and extracted via a stainless steel end-cap sealed with Viton O-rings (Polymax, UK) against the alumina tube. The reactor schematic is shown in FIG. 5.

Electrolyser Performance Tests

The NiO was reduced to Ni at 670° C. in a 25-75 $H_2$—He gas atmosphere for 2 hours after being heated at 4° C. $min^{-1}$ in a pure He atmosphere (Elite Thermal Systems Ltd., UK). After reduction, the cell was progressively heated to the operating temperatures (718, 764 and 809° C.) monitored by a K-type thermocouple. The operational gas feed molar compositions were 9:1 $CO_2$:CO with 40 ml $min^{-1}$ total flow rate, controlled by an automated mass-flow controller (Bronkhorst, UK), as were all gas flow rates. The oxygen electrode (electrolyser anode) was operated in static air.

Four-probe measurements were made by connecting the silver wires to a potentiostat/galvanostat capable of electrochemical impedance measurements using a frequency analyser (FRA) 4.9 module with test procedures created in the Nova 1.10.2 software (PGSTAT302N, Metrohm Autolab B.V., Netherlands). The potential difference response of the cell to linearly scanned applied current was measured, as was the electrochemical impedance at open circuit potential difference (OCPD) with a RMS amplitude of 0.01 V over a frequency range $10^5$-0.1 Hz.

The Ni-YSZ cathode gaseous product composition was measured using on-line mass-spectrometry (Genesys 200D, ESS Ltd, UK) to determine the charge yield of the cell.

Characterization of the Substrate

Figure 6:
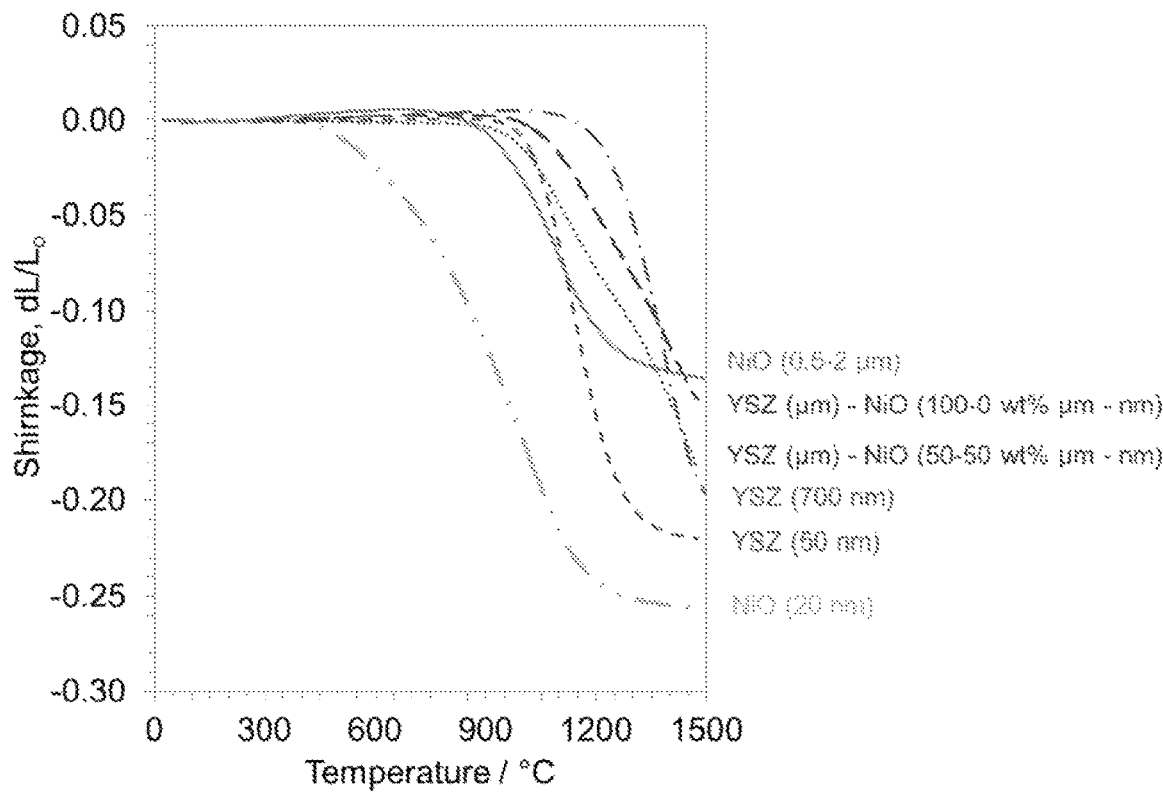
FIG. 6 shows a sintering behaviour of nano- and micrometre NiO, YSZ and NiO-YSZ mixtures with varying nano- and micrometre particle contributions to the NiO-YSZ component.

FIG. 6 shows the shrinkage behaviour of the individual constituent powders and mixtures. NiO and YSZ are inherently mismatched in their sintering behaviour. However, by combining nanometre with micrometre sized particles, essentially creating a bimodal particle size distribution, the final shrinkage of the NiO-YSZ substrate could be tailored to match that of a printed YSZ layer. This prevented stresses during sintering and enabled a flat, crack-free NiO-YSZ|YSZ dual-layer that could be co-sintered.

Figure 7:
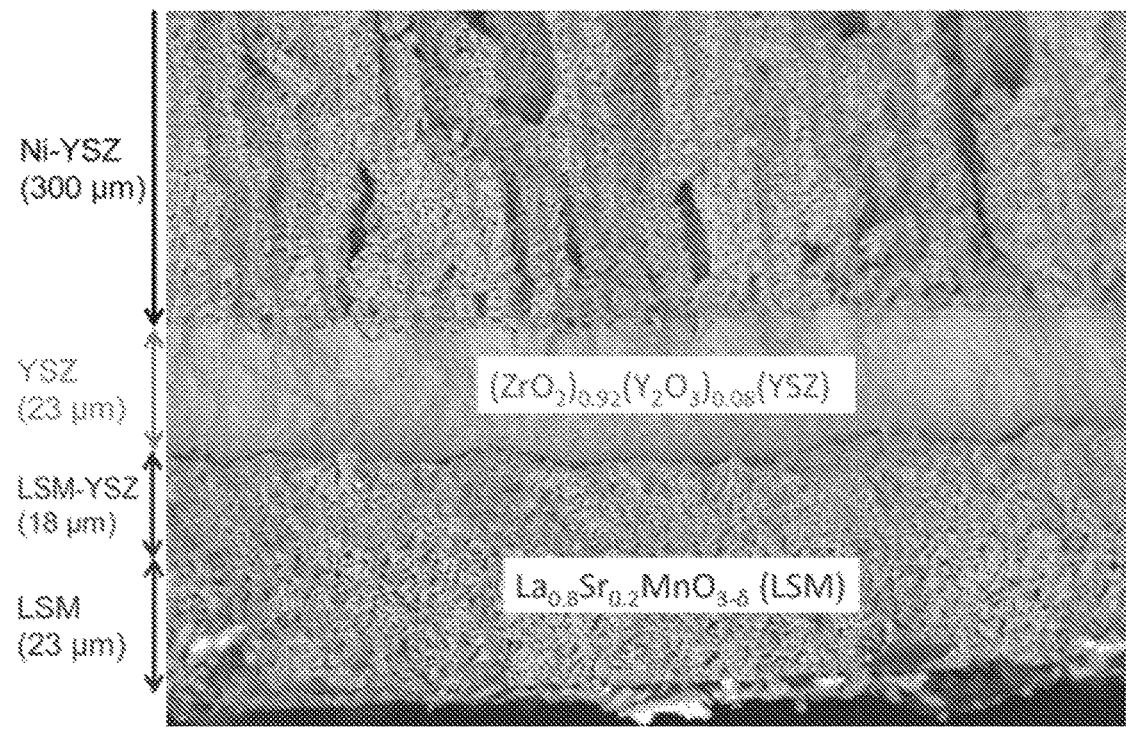
FIG. 7 shows a SEM image of cross-section of Ni-YSZ|YSZ|YSZ-LSM|LSM cell post-operation, with thicknesses of each layer.

The printed YSZ electrolyte phase was dense, crack-free and adhered well to the Ni-YSZ substrate (FIG. 7), whereas low density is a commonly reported limitation of inkjet printing. After sintering, the total thickness of the printed electrolyte phase was about 23 μm, corresponding to about 2 μm for each of the 12 printed layers; hence, there is scope for decreasing the electrolyte phase thickness, without compromising gas-tightness.

Electrochemical Performance

Figure 8:
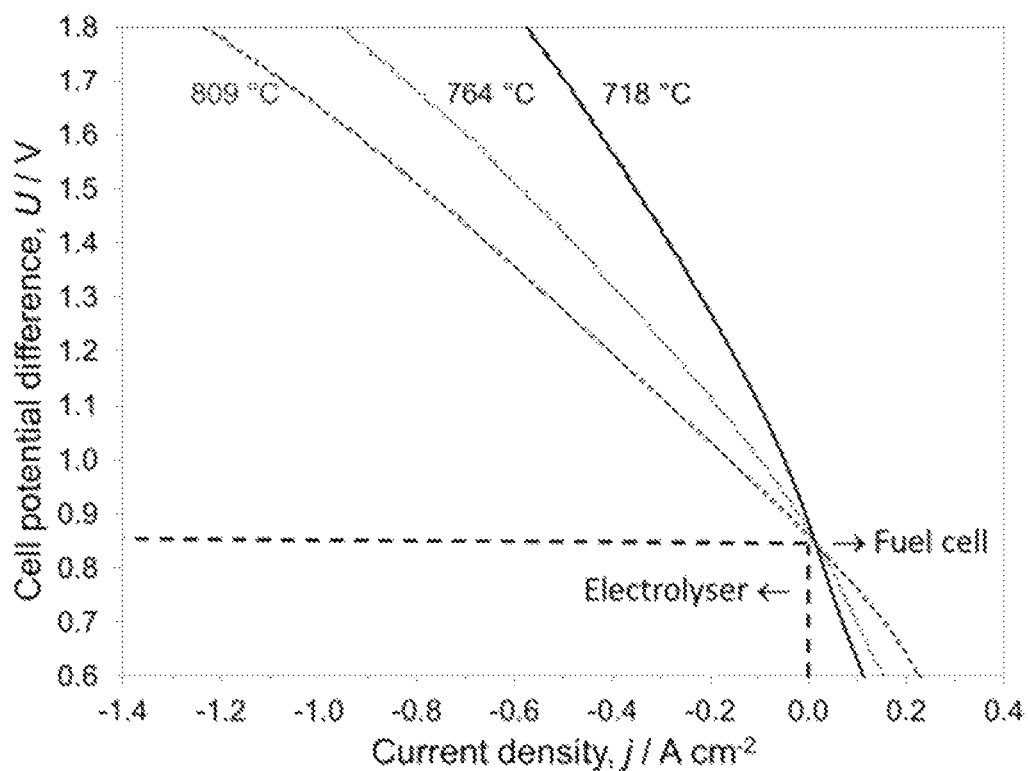
FIG. 8 shows the effects of temperature and applied current density on $CO_2(—CO)$|Ni-YSZ|YSZ|YSZ-LSM|LSM| air cell potential differences.

The open circuit potential differences were measured as 0.88 to 0.84 V at 718° C. and 809° C., respectively, which were close to the theoretically calculated values. Current densities achieved at the thermo-neutral potential difference (ca. 1.5 V) were between −0.35 and −0.78 A $cm^{-2}$ in the investigated temperature range (FIG. 8). Faradaic efficiencies/charge yields of 100% were confirmed by mass spectrometric concentration measurements of $CO_2$ reduced and CO produced. The maximum $CO_2$ conversion achieved was about 20% resulting in a CO to $CO_2$ ratio of 3:7. Hence, coking was not expected to occur, as the CO equilibrium fraction for the Boudouard reaction is 0.7-0.91.

Figure 9:
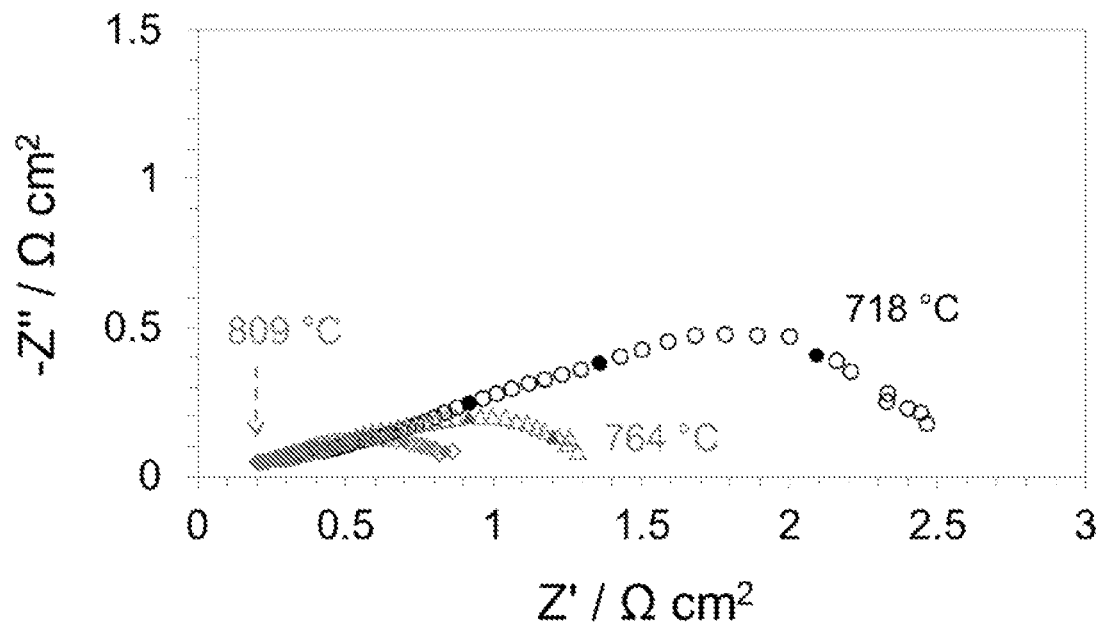
FIG. 9 shows an electrical impedance spectra ($10^5$-0.1 Hz) of $CO_2(—CO)$|Ni-YSZ|YSZ|YSZ-LSM|LSM| air cell at 718, 764 and 809° C.; filled markers indicate frequency decades.

The cell performance, as indicated by the area specific resistance, was dominated by the electrode polarisation contributions (FIG. 9), mainly due to the tape-cast Ni-YSZ substrate porosity not yet being optimised, so that restricted gas diffusion rates limited current densities.

Thus, it has been demonstrated that planar and 3D microstructures may be fabricated by drop-on-demand, piezoelectric inkjet printing. Five aqueous YSZ-based inks with differing solids loading, binding polymer concentration, and particle size were formulated, and planar structures of each were printed. Cracking was mitigated by maximizing particle size and minimizing polymeric binder concentration, which created depletion potentials that aggregated the metal oxide particles, decreasing their packing density, and hence increasing their ability to avoid cracking, in printed structures. Micro-pillar arrays and square lattices were printed subsequently with the optimal ink formulation, resulting in crack-free microstructures with a minimum feature resolution of 35 μm in the horizontal plane. The performance of an electrochemical cell with a 23 μm thick inkjet printed electrolyte for $CO_2$ electrolysis was then determined using a $CO_2$/CO mixture with a molar ratio of 9:1; at 809° C., a current density of −0.78 A $cm^{-2}$ was achieved at 1.5 V, the thermo-neutral potential difference.

Example 5—LSM Particle-Aluminon Dispersant Compositions

Four separate solutions were prepared. First 40 ml of deionised water had its pH adjusted to 9.5 by dropwise addition of dilute ammonia (aqueous). KCl (Sigma Aldrich, USA) was then dissolved in the solvent to a concentration of 10 mM. The 40 ml was then separated into 4×10 ml volumes, called solutions 1-4. In solutions 1 and 2, 0.2 g of as-purchased LSM powder (Fuel Cell Materials, USA) was added. In solutions 3 and 4, 0.1 g of LSM was added. The mass of aluminon added to each of solutions 1-4 was 20.8, 51.5, 52.1, 76.3 mg, respectively. The mass-specific surface area of the particles was determined by BET analysis ($N_2$ adsorption) as 10.24 $m^2$ $g^{-1}$ using a Micrometrics 3Flex BET instrument (Canada), and this was used to calculate the aluminon concentration with respect to LSM particle surface area. Each solution was ultrasonicated directly with a probe for 1-2 minutes. To measure zeta potential, a droplet of each solution was added to a plastic, disposable cuvette filled with deionised water at pH 9.5 and KCl concentration 10 mM, and shaken to homogenise the contents. Seven measurements were then taken, and the average of each was taken as the zeta potential.

Figure 10:
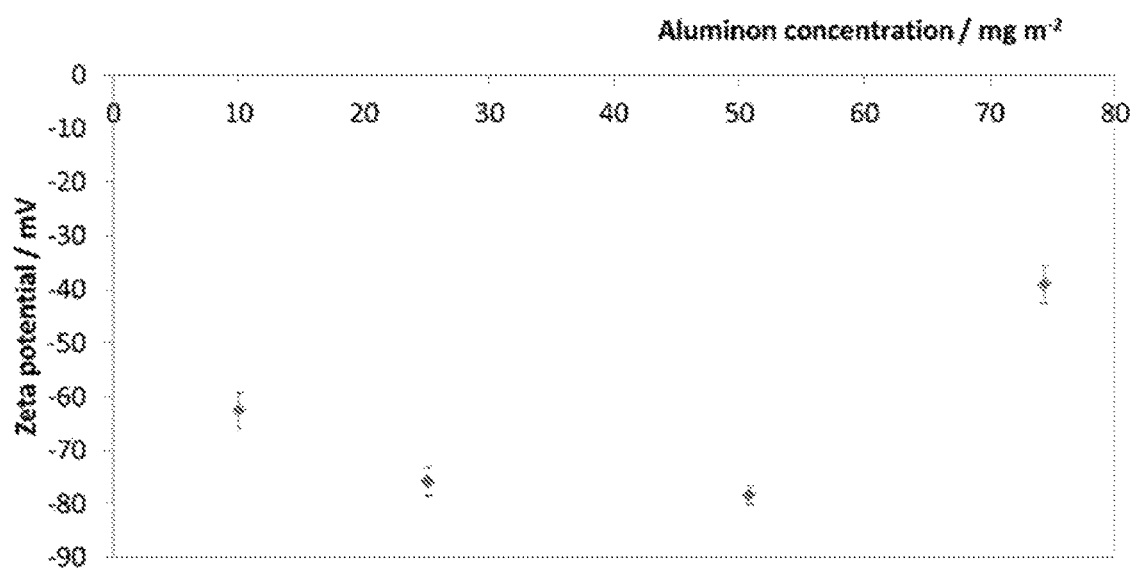
FIG. 10 shows the Zeta potential for a composition comprising LSM particles and varying concentrations of aluminon as electrostatic dispersant (pH 9.5).

The zeta potentials for the compositions comprising LSM particles and varying concentrations of aluminon as electrostatic dispersant are shown in FIG. 10. The error bars of the points in the graph are the standard deviation of the 7 measurements.

Example 6—Further Compositions

To collect CGO zeta potential data 6 solutions were made by dispersing CGO at different concentrations in deionised water with a KCl concentration of 10 mM. Dispex A40 (Ciba-BASF) was added at different area-specific concentration. CGO was dispersed by ultrasonicating each dispersion for 1-2 minutes. The compositions of the 6 solutions are shown in Table 3, and zeta potentials were measured using the same procedure as set out in Example 5. The mass-specific surface area of CGO ($Ce_{0.9}Gd_{0.1}O_{1.95}$, Fuel Cell Materials, USA) was measured as 13.77 $m^2$ $g^{-1}$ by BET measurements with $N_2$ adsorption.

TABLE 3

Compositions of CGO ink compositions

| Solution number | Volume $H_2O$ (KCl 10 mM)/ $cm^3$ | Mass of CGO/g | Dispex added/ mg $m^{-2}$ |
|---|---|---|---|
| 0 | 10 | 1.00 | 0 |
| 1 | 10 | 5.00 | 0.325 |
| 2 | 10 | 3.01 | 0.394 |
| 3 | 10 | 3.02 | 0.610 |

TABLE 3-continued

Compositions of CGO ink compositions

| Solution number | Volume H$_2$O (KCl 10 mM)/ cm$^3$ | Mass of CGO/g | Dispex added/ mg m$^{-2}$ |
|---|---|---|---|
| 4 | 10 | 2.01 | 0.807 |
| 5 | 10 | 2.00 | 1.077 |

The same procedure was followed for LSCF, except the pH of the solvent was made alkaline by dropwise addition of dilute ammonia. The compositions of the trailed dispersions are shown in Tables 4-8 below. Zeta potential was measured with the same procedure as CGO, outlined above. The mass-specific surface area of the LSCF particles was measured using the same method and conditions as above, as 14.36 m$^2$ g$^{-1}$.

TABLE 4

LSCF + Dispex FA Ultra 4416, pH 9.5

| Solution | Solvent volume/cm$^3$ | Mass of powder/g | Dispex FA concentration/ mg m$^{-2}$ |
|---|---|---|---|
| 1 | 10 | 0.5 | 0 |
| 2 | 10 | 1.008 | 10.1 |
| 3 | 10 | 0.999 | 20.2 |
| 4 | 10 | 0.9976 | 29.7 |
| 5 | 10 | 0.9991 | 39.3 |
| 6 | 10 | 1.0093 | 49.1 |

TABLE 5

LSCF + Dispex FA Ultra 4416, pH 10.8

| Solution | Solvent volume/cm$^3$ | Mass of powder/g | Dispex FA concentration/ mg m$^{-2}$ |
|---|---|---|---|
| 1 | 10 | 0.5 | 0 |
| 2 | 10 | 1.01 | 10.09 |
| 3 | 10 | 0.99 | 20.16 |
| 4 | 10 | 0.998 | 29.74 |
| 5 | 10 | 0.99 | 39.30 |
| 6 | 10 | 1.009 | 49.11 |

TABLE 6

LSCF + Dispex FAUltra 4416, pH 11.88

| Solution | Solvent volume/cm$^3$ | Mass of powder/g | Dispex FA concentration/ mg m$^{-2}$ |
|---|---|---|---|
| 0.3 | 10 | 0.5 | 0 |
| 1.3 | 10 | 1 | 10.09 |
| 2.3 | 10 | 1 | 20.16 |
| 3.3 | 10 | 1 | 29.74 |
| 4.3 | 10 | 1 | 39.30 |
| 5.3 | 10 | 1 | 49.11 |

TABLE 7

LSCF + Duramax D3005, pH 9.5, 10 mM KCl

| Solution | Solvent volume/ cm$^3$ | Mass of powder/g | Duramax concentration/ mg m$^{-2}$ |
|---|---|---|---|
| 1 | 10 | 0.9972 | 16.69 |
| 2 | 10 | 0.9984 | 39.33 |
| 3 | 10 | 1.0078 | 56.66 |
| 4 | 10 | 1.005 | 76.35 |

TABLE 7-continued

LSCF + Duramax D3005, pH 9.5, 10 mM KCl

| Solution | Solvent volume/ cm$^3$ | Mass of powder/g | Duramax concentration/ mg m$^{-2}$ |
|---|---|---|---|
| 5 | 10 | 1.01 | 97.4 |
| 6 | 10 | 3.013 | 1.885964714 |
| 7 | 10 | 2.4968 | 5.003584273 |
| 8 | 10 | 1.003 | 10.21302219 |
| 9 | 10 | 0.5069 | 13.53182819 |
| 10 | 10 | 0.5039 | 18.1452478 |

TABLE 8

LSCF + Duramax D3005, pH 10.5, 10 mM KCl

| Solution | Solvent volume/cm$^3$ | Mass of powder/g | Duramax concentration/ mg m$^{-2}$ |
|---|---|---|---|
| 1 | 10 | 1.505 | 5.88 |
| 2 | 10 | 0.749 | 8.92 |
| 3 | 10 | 0.498 | 19.68 |
| 4 | 10 | 0.301 | 34.18 |
| 5 | 10 | 0.200 | 49.32 |

Figure 11:
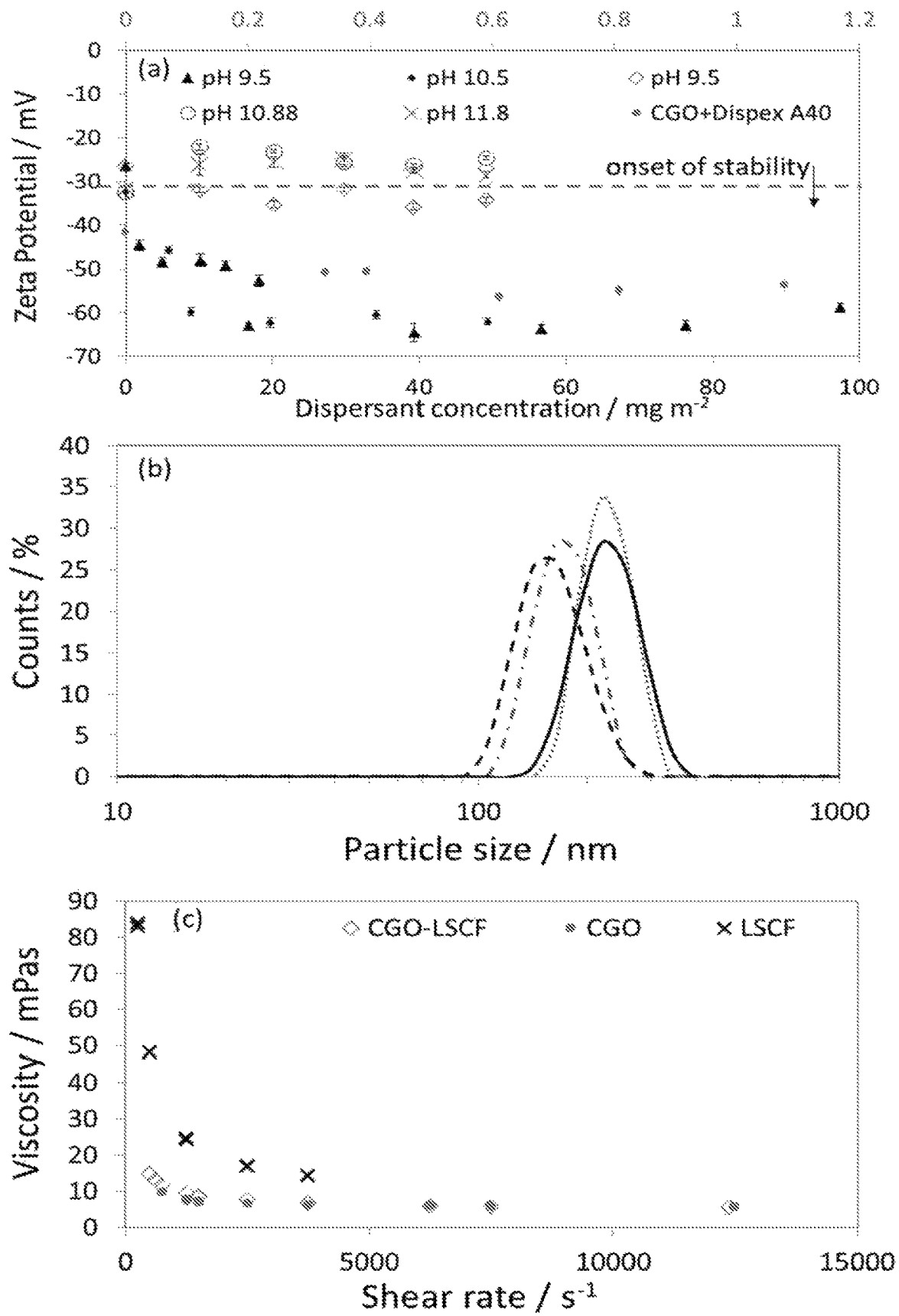
FIG. 11 shows (a) the Zeta potential, (b) particle size distribution and (c) viscosity-shear relationship several compositions.

FIG. 11 shows (a) the Zeta potential of CGO (solid circular markers corresponding to top horizontal axis) and LSCF (solid triangular markers) particles dispersed in water, with different dispersant concentrations: Dispex A40 (solid circular markers), Dispex Ultra FA 4416 (no-fill markers) and Duramax D3005 (solid triangular and diamond markers); and (b) particle size distribution of the filtered CGO (dotted), LSCF (solid), and CGO-LSCF aqueous inks in intensity (-•-) and volume (---) counts.

Particle size distributions were measured by a dynamic light scattering technique. Using the most stable CGO and LSCF dispersions, defined as by having the zeta potential with the greatest magnitude, were diluted with deionised water to a sufficiently low concentration that light could pass through them. Measurements were taken at 25° C.

Ink Fabrication

FIG. 11c shows viscosity-shear relationship for CGO (circles), LSCF (crosses) and CGO-LSCF (diamonds) ink compositions.

The particles were dispersed at the optimum concentration with the most effective dispersant, which were:

0.8 mg m$^{-2}$ Dispex A40 for CGO 20 mg m$^{-2}$ Duramax D3005, pH 9.5 for LSCF The CGO dispersion was centrifuged at a relative centrifugal force (RCF) of 1,300 for 1 minute, and subsequently filtered with a syringe filter (DISMIC-25CS, Toya Roshi, Japan) to remove particles >800 nm in diameter. Viscosity (η) and surface tension (γ) were adjusted, respectively, by addition of 25 mg cm$^{-3}$ poly(ethylene glycol) (Sigma Aldrich, USA) and 0.2 mg cm$^{-3}$ Natsurf 265 (Croda, UK). The final solids loading, density (ρ), η, and γ were 13 wt %, 1.148 g cm$^{-3}$, 4.95 mPa s (FIG. 11c using a Brookfield DV-E Viscometer (Brookhaven, USA)) and 28 mN m, respectively. The resulting Oh$^{-1}$ number was 8.3.

The LSCF dispersion was centrifuged at 1300 RCF for 1 minute, and filtered to remove particles >800 nm in diameter. 10 mg cm$^{-3}$ PEG 35000 and 0.2 mg cm$^{-3}$ Natsurf 265 were added, to adjust viscosity and surface tension, respectively. The resulting solid loading, ρ, η, and γ were 13 wt %, 1.15 g cm$^{-3}$, 8.0 mPa s (FIG. 11c), and 28 mN m, respectively. The resulting Oh$^{-1}$ number was 5.1.

To create the composite ink (CGO-LSCF in FIG. 11c), volumes of the individual CGO and LSCF inks were mixed together in the appropriate amounts resulting in an ink that was 1:1 mass ratio CGO:LSCF.

Embodiments of the invention have been described by way of example only. It will be appreciated that variations of the described embodiments may be made which are still within the scope of the invention.

The invention claimed is:

1. An aqueous ink composition comprising:
   an aqueous solvent;
   particles comprising a metal or a metal compound or a mixture thereof;
   a dispersant, wherein the dispersant is an electrostatic dispersant and is present at an amount of 0.1 to 1 mg $m^{-2}$ of the surface area of the particles;
   a polymeric binder; and
   a non-ionic surfactant.

2. The aqueous ink composition of claim 1, wherein the particles comprise a metal oxide.

3. The aqueous ink composition of claim 1, wherein the particles comprise zirconium, yttrium, lanthanum, strontium, manganese, nickel, cobalt, cerium, silver or gadolinium or mixtures thereof.

4. The aqueous ink composition of claim 1, wherein the particles comprise yttria-stabilised zirconia (YSZ), lanthanum nickelates, lanthanum strontium manganite (LSM), lanthanum cobaltites, gadolinium doped ceria (GDC), nickel oxide or silver oxide, or mixtures thereof.

5. The aqueous ink composition of claim 1, wherein the particles comprise yttria-stabilised zirconia (YSZ).

6. The aqueous ink composition of claim 1, wherein the particles comprising a metal or a metal compound or a mixture thereof have an average particle diameter of about 1000 nm or less.

7. The aqueous ink composition of claim 1, wherein the dispersant is an ammonium salt of an acrylic polymer, or wherein the composition further comprises a steric dispersant, an ionic dispersant, a non-ionic dispersant or a combination thereof.

8. The aqueous ink composition of claim 1, wherein the electrostatic dispersant is present at an amount of about 0.2 to about 0.8 mg $m^{-2}$ of the surface area of the particles comprising a metal or a metal compound or a mixture thereof, or wherein the dispersant is a steric dispersant and is present at an amount of about 10 to about 300 mg $m^{-2}$ of the surface area of the particles comprising a metal or a metal compound or a mixture thereof.

9. The aqueous ink composition of claim 1, wherein the polymeric binder is present in the aqueous ink composition at a concentration of about 10 to about 50 mg $cm^{-3}$.

10. The aqueous ink composition of claim 1, wherein the non-ionic surfactant is present in the aqueous ink composition at a concentration of about 0.1 to about 0.5 mg $cm^{-3}$.

11. The aqueous ink composition of claim 1 having a dynamic viscosity of about 2 to about 20 mPa s.

12. The aqueous ink composition of claim 1 having a critical cracking thickness of at least 10 μm.

13. The aqueous ink composition of claim 1,
   wherein the particles comprise yttria-stabilised zirconia (YSZ), lanthanum nickelates, lanthanum strontium manganite (LSM), lanthanum cobaltites, gadolinium doped ceria (GDC), nickel oxide or silver oxide, or mixtures thereof;
   wherein the dispersant is an electrostatic dispersant present at an amount of about 0.1 to about 1 mg $m^{-2}$ of the surface area of the particles comprising a metal or a metal compound or a mixture thereof; and
   wherein the particles comprising a metal or a metal compound or a mixture thereof have an average particle diameter of about 1000 nm or less.

14. An article obtainable by printing an aqueous ink composition of claim 1.

15. A method of preparing an aqueous ink composition according to claim 1 comprising the steps of:
   (a) providing an aqueous solvent and adding a dispersant to the aqueous solvent;
   (b) dispersing particles comprising a metal or a metal compound or a mixture thereof in the aqueous solvent; and
   (c) adding a polymeric binder and a non-ionic surfactant to the aqueous dispersion.

16. The method of claim 15, wherein step (b) is carried out after step (a).

17. The method of claim 15, further comprising the step of concentrating the aqueous dispersion by removal of the aqueous solvent before adding the polymeric binder and the non-ionic surfactant.

18. The method of claim 15, wherein the particles comprising a metal or a metal compound or a mixture thereof are dispersed in the aqueous solvent by sonication.

19. The method of claim 15, further comprising the step of narrowing the particle size distribution after dispersing the particles comprising a metal or a metal compound or a mixture thereof in the aqueous solvent.

20. A method of producing a printed article comprising the steps of:
   (a) providing a substrate;
   (b) printing the aqueous ink composition of claim 1 onto the substrate to form a printed article; optionally
   (c) drying the printed article; and optionally
   (d) heat treating the printed article.

21. The method according to claim 20, wherein the method further comprises the step of preparing the aqueous ink composition, prior to step (b).

22. The method according to claim 20, wherein the step of printing the aqueous ink composition comprises printing a layer on the substrate of a thickness of about 1 to about 500 μm.

23. The method according to claim 20, wherein the substrate is an electrode in a solid oxide fuel cell or a solid oxide electrolyser.

* * * * *